US009538532B2

(12) United States Patent
Yang et al.

(10) Patent No.: US 9,538,532 B2
(45) Date of Patent: *Jan. 3, 2017

(54) METHOD FOR TRANSMITTING/RECEIVING SIGNAL AND DEVICE THEREFOR

(71) Applicant: LG ELECTRONICS INC., Seoul (KR)

(72) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,692

(22) Filed: Jan. 8, 2016

(65) Prior Publication Data

US 2016/0119923 A1    Apr. 28, 2016

Related U.S. Application Data

(63) Continuation of application No. 14/665,971, filed on Mar. 23, 2015, now Pat. No. 9,277,553, which is a (Continued)

(51) Int. Cl.
*H04J 3/00* (2006.01)
*H04W 72/04* (2009.01)
(Continued)

(52) U.S. Cl.
CPC ....... *H04W 72/0446* (2013.01); *H04B 7/2656* (2013.01); *H04L 1/18* (2013.01);
(Continued)

(58) Field of Classification Search
CPC ................ H04W 72/0446; H04W 72/1289; H04W 72/04; H04L 5/0032; H04L 5/22; H04L 1/18; H04L 5/14; H04L 5/0055; H04L 5/1469; H04L 5/001; H04L 25/03891; H04B 7/2656

See application file for complete search history.

(56) References Cited

U.S. PATENT DOCUMENTS 8,054,767 B2    11/2011    Choi et al.
8,537,729 B2    9/2013    Hao et al.
(Continued)

FOREIGN PATENT DOCUMENTS

CN    101741710    6/2010
CN    101984568    3/2011
(Continued)

OTHER PUBLICATIONS

3rd Generation Partnership Project (3GPP), "Technical Specification Group Radio Access Network; Evolved Universal Terrestrial Radio Access (E-UTRA); Physical channels and modulation (Release 10)," 3GPP TS 36211 V1 0.0.0, Dec. 2010, XP050462365, 103 pages.

(Continued)

*Primary Examiner* — Clemence Han
(74) *Attorney, Agent, or Firm* — Lee, Hong, Degerman, Kang & Waimey

(57) ABSTRACT

The present invention relates to a wireless communication system. More particularly, the present invention relates to a method comprising: setting a first cell having a first TDD UL-DL configuration and a second cell having a second TDD UL-DL configuration; receiving a PHICH signal in a subframe #(n–L) of the first cell, or receiving a PDCCH signal in a subframe #(n–K) of the first cell; and transmitting a PUSCH signal in a subframe #n of the second cell, corresponding to the PHICH signal or the PDCCH signal, wherein the relationship between the subframes #(n–L), #(n–K), and #n is determined in consideration of a param-
(Continued)

eter value set in a specific TDD UL-DL configuration, which is the TDD UL-DL configuration having the least number of UL subframes from TDD UL-DL configuration(s), in which subframes set as UL in the first or second cell are all set as ULs.

20 Claims, 20 Drawing Sheets

Related U.S. Application Data continuation of application No. 14/007,279, filed as application No. PCT/KR2012/002181 on Mar. 26, 2012, now Pat. No. 9,019,871.

(60) Provisional application No. 61/466,939, filed on Mar. 24, 2011, provisional application No. 61/554,477, filed on Nov. 1, 2011, provisional application No. 61/597,111, filed on Feb. 9, 2012, provisional application No. 61/588,662, filed on Jan. 20, 2012, provisional application No. 61/596,208, filed on Feb. 7, 2012, provisional application No. 61/473,162, filed on Apr. 8, 2011, provisional application No. 61/560,792, filed on Nov. 16, 2011, provisional application No. 61/473,163, filed on Apr. 8, 2011, provisional application No. 61/603,954, filed on Feb. 28, 2012, provisional application No. 61/603,888, filed on Feb. 27, 2012.

(51) Int. Cl.
*H04L 5/14* (2006.01)
*H04L 1/18* (2006.01)
*H04L 5/22* (2006.01)
*H04B 7/26* (2006.01)
*H04W 72/12* (2009.01)
*H04L 5/00* (2006.01)
*H04L 25/03* (2006.01)

(52) U.S. Cl.
CPC .......... *H04L 5/0032* (2013.01); *H04L 5/0055* (2013.01); *H04L 5/14* (2013.01); *H04L 5/1469* (2013.01); *H04L 5/22* (2013.01); *H04W 72/04* (2013.01); *H04W 72/1289* (2013.01); *H04L 5/001* (2013.01); *H04L 25/03891* (2013.01)

(56) References Cited

U.S. PATENT DOCUMENTS

| | | | |
|---|---|---|---|
| 8,553,591 B2 | 10/2013 | Jiang et al. | |
| 8,559,343 B2 | 10/2013 | Parkvall et al. | |
| 8,705,556 B2 | 4/2014 | Wang et al. | |
| 8,958,349 B2 | 2/2015 | Wang et al. | |
| 8,976,718 B2 | 3/2015 | Joung et al. | |
| 2009/0219875 A1 | 9/2009 | Kwak et al. | |
| 2009/0285122 A1* | 11/2009 | Onggosanusi | H04L 1/1607 370/254 |
| 2010/0050039 A1* | 2/2010 | Zhang | H04L 1/1822 714/749 |
| 2010/0097937 A1 | 4/2010 | Pietraski et al. | |
| 2010/0128643 A1 | 5/2010 | Tanaka | |
| 2010/0165939 A1 | 7/2010 | Lin | |
| 2010/0210256 A1* | 8/2010 | Shen | H04L 1/1614 455/422.1 |
| 2010/0260277 A1 | 10/2010 | Onodera et al. | |
| 2011/0013542 A1 | 1/2011 | Yu et al. | |
| 2011/0039568 A1* | 2/2011 | Zhang | H04W 52/50 455/452.1 |
| 2011/0149813 A1* | 6/2011 | Parkvall | H04B 7/2656 370/280 |
| 2011/0194443 A1 | 8/2011 | Li et al. | |
| 2011/0239076 A1* | 9/2011 | Liu | H03M 13/6306 714/751 |
| 2011/0267992 A1* | 11/2011 | Seo | H04B 7/2606 370/279 |
| 2012/0099491 A1 | 4/2012 | Lee et al. | |
| 2012/0257554 A1* | 10/2012 | Kim | H04L 5/001 370/280 |
| 2012/0281601 A1 | 11/2012 | Kuo et al. | |
| 2012/0294272 A1* | 11/2012 | Han | H04L 1/0027 370/329 |
| 2013/0083706 A1 | 4/2013 | Lin | |
| 2013/0107766 A1 | 5/2013 | Etemad | |
| 2013/0188532 A1 | 7/2013 | Zhang et al. | |
| 2013/0208634 A1 | 8/2013 | Ji et al. | |
| 2013/0215803 A1 | 8/2013 | Lee et al. | |
| 2014/0022962 A1 | 1/2014 | Yang et al. | |
| 2014/0334357 A1 | 11/2014 | Yang et al. | |
| 2014/0334358 A1 | 11/2014 | Yang et al. | |
| 2016/0021659 A1 | 1/2016 | Yang et al. | |

FOREIGN PATENT DOCUMENTS

| | | |
|---|---|---|
| CN | 101989897 | 3/2011 |
| KR | 10-2009-0095592 A | 9/2009 |
| KR | 10-2010-0082291 A | 7/2010 |
| KR | 10-2010-0134023 A | 12/2010 |
| KR | 10-2011-0003584 A | 1/2011 |
| WO | 2010/019522 | 2/2010 |
| WO | 2010/104290 A2 | 9/2010 |

OTHER PUBLICATIONS

European Patent Office Application Serial No. 12760090.6, Search Report dated Sep. 23, 2014, 11 pages.
PCT International Application No. PCT/KR2012/002181 Written Opinion of the International Searching Authority, dated Oct. 24, 2012, 17 pages.
Texas Instruments, et al., "ACK/NAK repetition for TDD ACK/NAK multiplexing," 3GPP TSG-RAN1 Meeting #55bis, R1-090483, Jan. 2009, 9 pages.
The State Intellectual Property Office of the People's Republic of China Application Serial No. 201280014898.7, Office Action dated Aug. 3, 2015, 7 pages.
Huawei, et al., "ACK/NACK feedback with channel selection for TDD" 3GPP TSG RAN WG1 Meeting #63, R1-106152, Nov. 2010, 5 pages.
The State Intellectual Property Office of the People's Republic of China Application Serial No. 201280014889.8, Dffice Action dated Aug. 3, 2015, 5 pages.
PCT International Application No. PCT/KR2012/002184 Written Opinion of the International Searching Authority, dated Oct. 25, 2012, 15 pages.
3rd Generation Partnership Project (3GPP), Technical Specification Group Radio Access Network; Evolved Universal Terrestrial Radio Access (E-UTRA); Physical layer procedures (Release 10), 3GPP TS 36213 V10.0.1, Dec. 2010, XP050462385, 98 pages.
3rd Generation Partnership Project (3GPP), "Technical Specification Group Radio Access Network; Evolved Universal Terrestrial Radio Access (E-UTRA); Physical channels and modulation (Release 10)," 3GPP TS 36/11 V1 0.0.0, Dec. 2010, XP050462365, 103 pages.
Qualcomm Incorporated, "On ACK/NAK codebook size determination with respect to special subframes in TDD," 3GPP TSG-RAN WG1 #64, R1-110913, XP050599144, Feb. 2011, 2 pages.
Huawei, "UL ACK/NACK resource allocation for carrier aggregation," 3GPP TSG RAN WG1 Meeting #60, R1-101051, Feb. 2010, XP050418622, 6 pages.
LG Electronics, "Overall structure for full-duplex operation based TOO CA with different UL-DL configurations," 3GPP TSG RAN WG1 #68, R1-120420, XP050562909, Feb. 2012, 8 pages.
European Patent Office Application Serial No. 127599942, Search Report dated Sep. 23, 2014, 12 pages.

(56) References Cited

OTHER PUBLICATIONS

United States Patent and Trademark Office U.S. Appl. No. 14/007,198, Notice of Allowance dated Nov. 26, 2014, 11 pages.
MediaTek Inc., "HARQ Feedback Mechanism in CA with Different TDD Configurations," 3GPP TSG-RAN WG1 Meeting #66, R1-112349, Aug. 2011, 5 pages.
Email Rapporteur (CMCC), "Email Summary on inter-band TDD CA," 3GPP TSG-RAN WG1 #69, R1-122708, May 2012, 30 pages.

\* cited by examiner

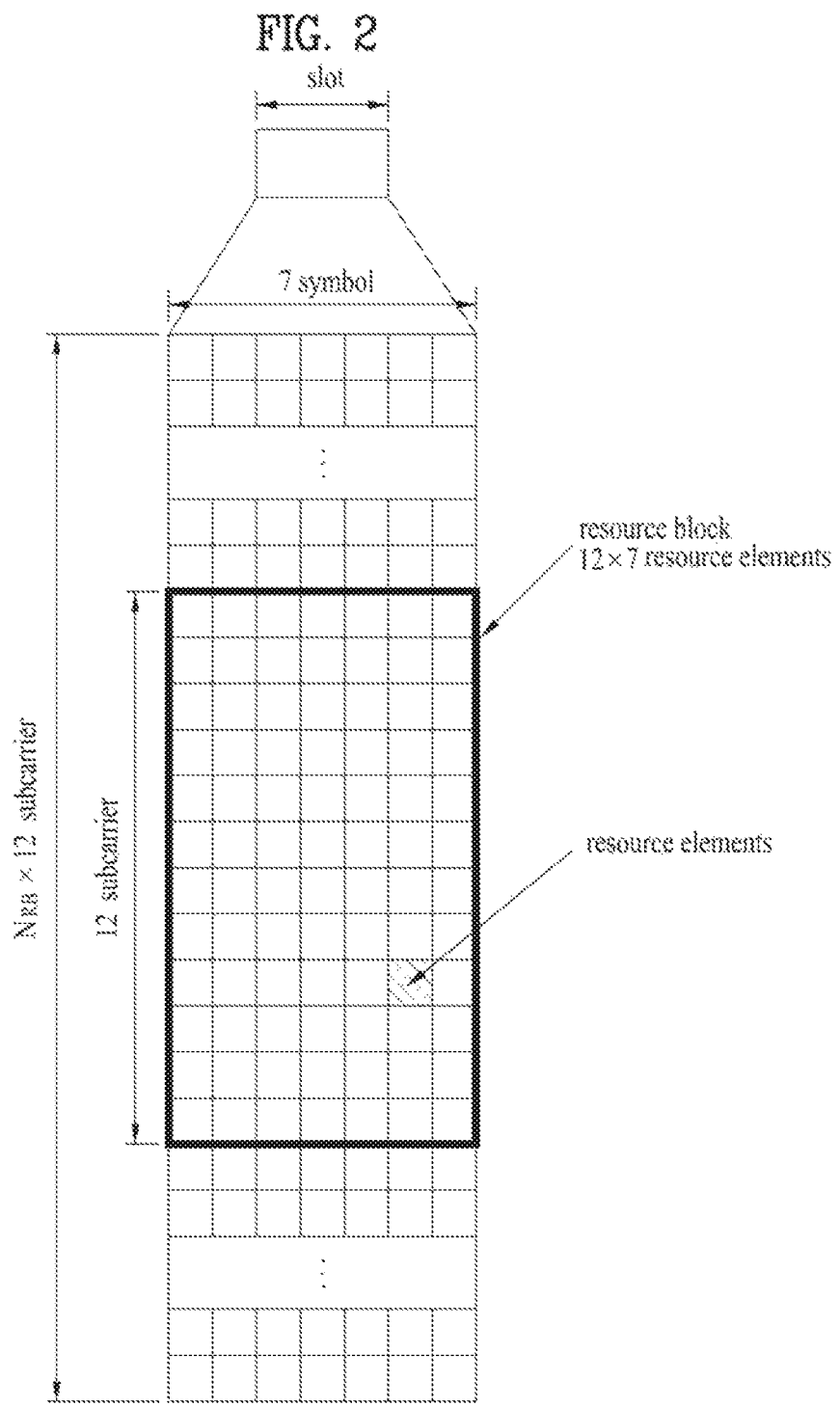

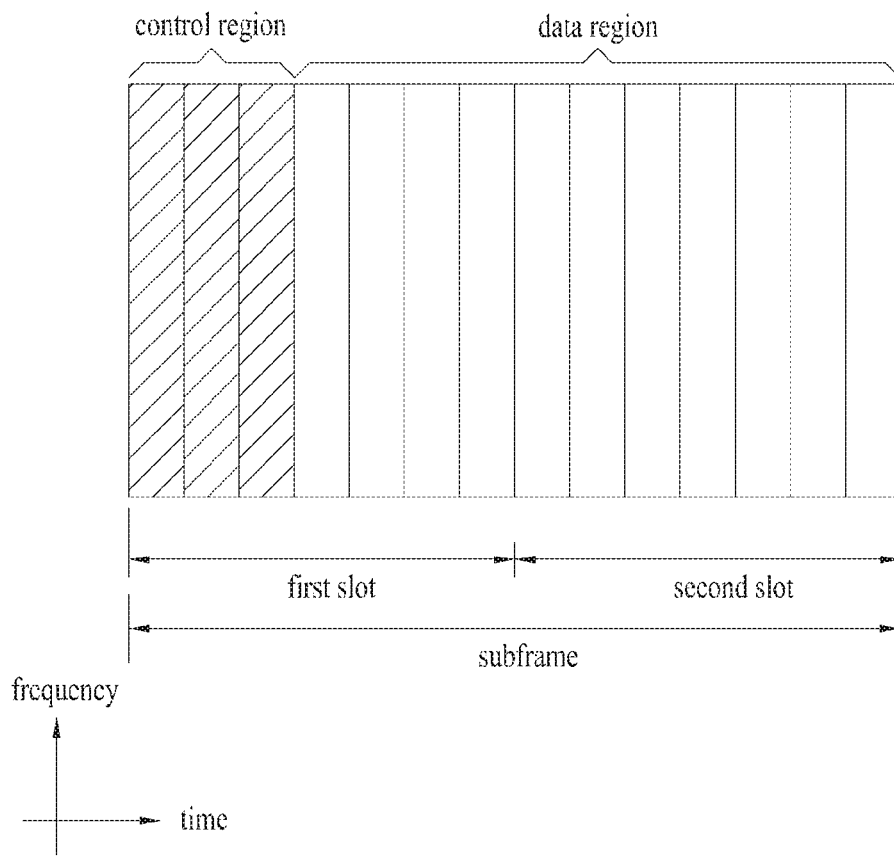
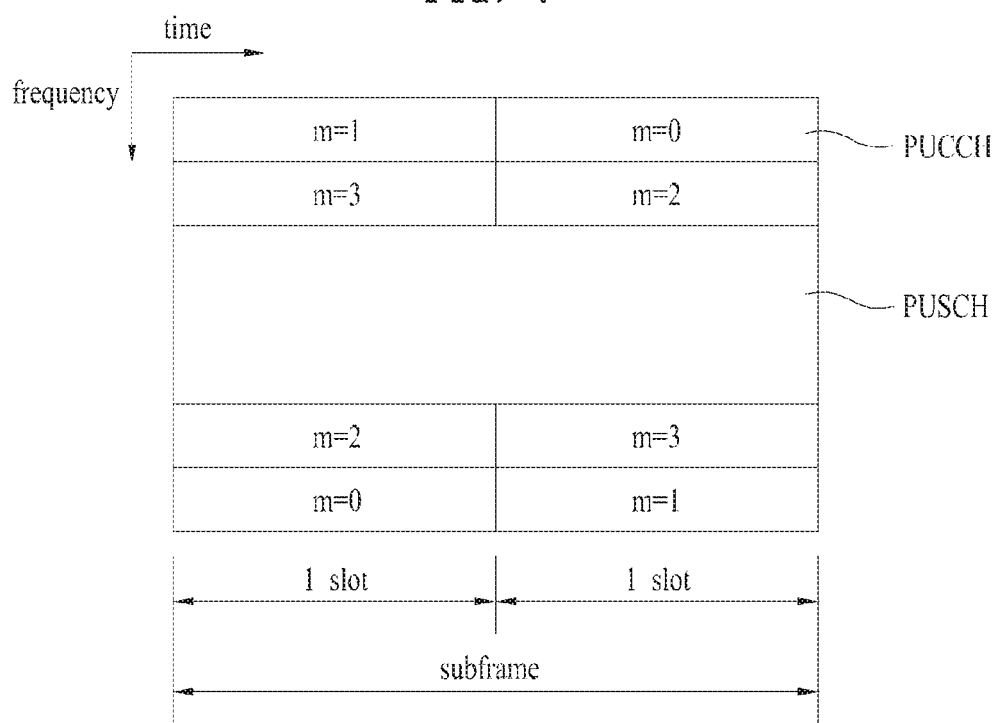

HARQ processes in UL-DL configuration #1

FIG. 14

| UD-cfg | Subframe number |||||||||| 
|---|---|---|---|---|---|---|---|---|---|---|
| | 0 | 1 | 2 | 3 | 4 | 5 | 6 | 7 | 8 | 9 |
| #3 (PCC) (*) | D | S | U | U | U | D | D | D | D | D |
| #6 (SCC) | D | S | U | U | U | D | S | U | U | D |

| UD-cfg | Subframe number |||||||||| 
|---|---|---|---|---|---|---|---|---|---|---|
| | 0 | 1 | 2 | 3 | 4 | 5 | 6 | 7 | 8 | 9 |
| #0 | D | S | U | U | U | D | S | U | U | U |

(a) ACK/NACK timing

| UD-cfg | Subframe number |||||||||| 
|---|---|---|---|---|---|---|---|---|---|---|
| | 0 | 1 | 2 | 3 | 4 | 5 | 6 | 7 | 8 | 9 |
| #3 (PCC) (*) | D | S | U | U | U | D | D | D | D | D |
| #6 (SCC) | D | S | U | U | U | D | S | U | U | D |

| UD-cfg | Subframe number |||||||||| 
|---|---|---|---|---|---|---|---|---|---|---|
| | 0 | 1 | 2 | 3 | 4 | 5 | 6 | 7 | 8 | 9 |
| #4 | D | S | U | U | D | D | D | D | D | D |
| #5 | D | S | U | D | D | D | D | D | D | D |

(b) ACK/NACK timing (DL union)

FIG. 15

| UD-cfg | Subframe number | | | | | | | | | |
|---|---|---|---|---|---|---|---|---|---|---|
| | 0 | 1 | 2 | 3 | 4 | 5 | 6 | 7 | 8 | 9 |
| #2 (PCC) | D | S | U | D | D | D | S | U | D | D |
| #4 (SCC) | D | S | U | U | U | D | S | U | U | D |

| UD-cfg | Subframe number | | | | | | | | | |
|---|---|---|---|---|---|---|---|---|---|---|
| | 0 | 1 | 2 | 3 | 4 | 5 | 6 | 7 | 8 | 9 |
| #0 | D | S | U | U | U | D | S | U | U | U |
| #1 | D | S | U | U | D | D | S | U | U | D |
| #3 | D | S | U | U | U | D | D | D | D | D |
| #5 (*) | D | S | U | D | D | D | D | D | D | D |
| #6 | D | S | U | U | U | D | S | U | U | D |

(a) ACK/NACK timing

| UD-cfg | Subframe number | | | | | | | | | |
|---|---|---|---|---|---|---|---|---|---|---|
| | 0 | 1 | 2 | 3 | 4 | 5 | 6 | 7 | 8 | 9 |
| #2 (PCC) | D | S | U | D | D | D | S | U | D | D |
| #4 (SCC) | D | S | U | U | D | D | D | D | D | D |

| UD-cfg | Subframe number | | | | | | | | | |
|---|---|---|---|---|---|---|---|---|---|---|
| | 0 | 1 | 2 | 3 | 4 | 5 | 6 | 7 | 8 | 9 |
| #5 (*) | D | S | U | D | D | D | D | D | D | D |

(b) ACK/NACK timing (DL union)

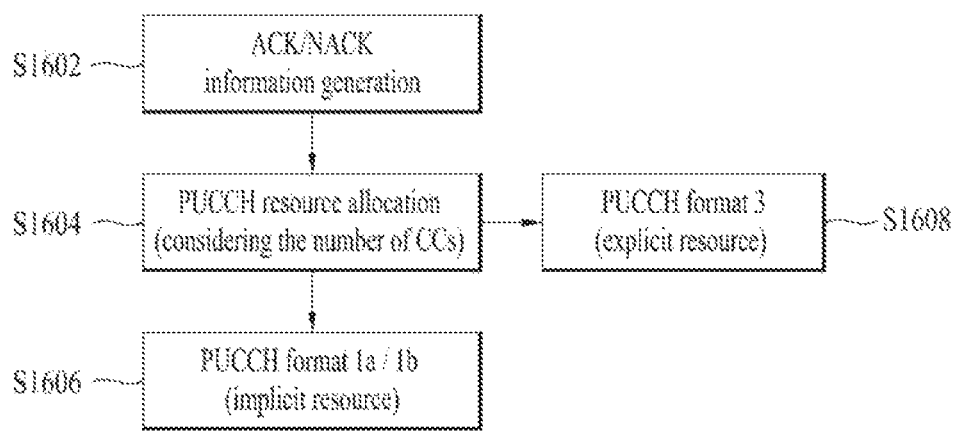

FIG. 18

| UD-cfg | Subframe number | | | | | | | | | |
|---|---|---|---|---|---|---|---|---|---|---|
| | 0 | 1 | 2 | 3 | 4 | 5 | 6 | 7 | 8 | 9 |
| #2 (PCC) | D | S | U | D | D | D | S | U | D | D |
| #4 (SCC) | D | S | U | U | D | D | D | D | D | D |

| UD-cfg | Subframe number | | | | | | | | | |
|---|---|---|---|---|---|---|---|---|---|---|
| | 0 | 1 | 2 | 3 | 4 | 5 | 6 | 7 | 8 | 9 |
| #0 | D | S | U | U | U | D | S | U | U | U |
| #1 (*) | D | S | U | U | D | D | S | U | U | D |
| #6 | D | S | U | U | U | D | S | U | U | D |

UG / PHICH timing (UL union)

FIG. 19

| UD-cfg of PCC or MCC \ UD-cfg of SCC | #0 | #1 | #2 | #3 | #4 | #5 | #6 |
|---|---|---|---|---|---|---|---|
| #0 | | | | | | | |
| #1 | | | | | ▨ | | |
| #2 | | | | | ▨ | ▨ | |
| #3 | | ▨ | ▨ | | | | |
| #4 | | | ▨ | | | | |
| #5 | | | | | | | |
| #6 | | | | | | | |

FIG. 20

| UD-cfg of PCC or MCC \ UD-cfg of SCC | #0 | #1 | #2 | #3 | #4 | #5 | #6 |
|---|---|---|---|---|---|---|---|
| #0 |  | ▨ | ▨ | ▨ | ▨ | ▨ | ▨ |
| #1 |  |  | ▨ | ▨ |  |  |  |
| #2 |  |  |  | ▨ |  |  |  |
| #3 |  | ▨ | ▨ |  |  |  |  |
| #4 |  |  |  |  |  |  |  |
| #5 |  |  |  |  |  |  |  |
| #6 |  | ▨ | ▨ | ▨ | ▨ | ▨ |  |

(a) MCC: MCC UG / PHICH timing, SCC: common UL / PHICH timing

| UD-cfg of PCC or MCC \ UD-cfg of SCC | #0 | #1 | #2 | #3 | #4 | #5 | #6 |
|---|---|---|---|---|---|---|---|
| #0 |  | ▨ | ▨ | ▨ | ▨ | ▨ | ▨ |
| #1 | ▨ |  |  | ▨ |  |  | ▨ |
| #2 | ▨ |  |  | ▨ |  |  | ▨ |
| #3 | ▨ | ▨ | ▨ |  |  |  | ▨ |
| #4 | ▨ |  |  |  |  |  | ▨ |
| #5 | ▨ |  |  |  |  |  | ▨ |
| #6 | ▨ | ▨ | ▨ | ▨ | ▨ | ▨ |  |

(b) MCC and SCC: common UL / PHICH timing

FIG. 21
MCC: UD-cfg #0
| UD-cfg of SCC | SF number of MCC (UG timing of SCC) | | | | | | | | | |
|---|---|---|---|---|---|---|---|---|---|---|
| | 0 | 1 | 2 | 3 | 4 | 5 | 6 | 7 | 8 | 9 |
| #1 | | 6 | U | U | | | 6 | U | U | |
| #2 | | 6 | U | | | | 6 | U | | |
| #3 | 4 | | U | U | U | | 6 | | | |
| #4 | | | U | U | | | 6 | | | |
| #5 | | | U | | | | 6 | | | |
| #6 | 4 | 6 | U | U | U | | 6 | U | U | |
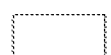 : MCC DL SF (UG / PHICH transmission is possible on MCC)
 : MCC UL SF (No UG / PHICH transmission on MCC)
U: SCC UL SF (PUSCH transmission is possible on SCC)
U: 10-SFs HARQ supportable U of SCC

FIG. 22

MCC: UD-cfg #1

| UD-cfg of SCC | SF number of MCC (UG timing of SCC) | | | | | | | | | |
|---|---|---|---|---|---|---|---|---|---|---|
| | 0 | 1 | 2 | 3 | 4 | 5 | 6 | 7 | 8 | 9 |
| #3 | 4 | | U | U | U | | 6 | | | 4 |

 : MCC DL SF (UG / PHICH transmission is possible on MCC)

 : MCC UL SF (No UG / PHICH transmission on MCC)

U: SCC UL SF (PUSCH transmission is possible on SCC)

U: 10-SFs HARQ supportable U of SCC

FIG. 23

MCC: UD-cfg #2

| UD-cfg of SCC | SF number of MCC (UG timing of SCC) | | | | | | | | | |
|---|---|---|---|---|---|---|---|---|---|---|
| | 0 | 1 | 2 | 3 | 4 | 5 | 6 | 7 | 8 | 9 |
| #3 | 4 | | U | U | U | | | | 4 | 4 |

 : MCC DL SF (UG / PHICH transmission is possible on MCC)

 : MCC UL SF (No UG / PHICH transmission on MCC)

U: SCC UL SF (PUSCH transmission is possible on SCC)

U: 10-SFs HARQ supportable U of SCC

FIG. 24

MCC: UD-cfg #3

| UD-cfg of SCC | SF number of MCC (UG timing of SCC) | | | | | | | | | |
|---|---|---|---|---|---|---|---|---|---|---|
| | 0 | 1 | 2 | 3 | 4 | 5 | 6 | 7 | 8 | 9 |
| #1 | | | 6 | U | U | | | | U | U/4 | 4 |
| #2 | | | 6 | U | | | | | | U | 4 |

 : MCC DL SF (UG / PHICH transmission is possible on MCC)

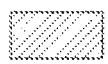 : MCC UL SF (No UG / PHICH transmission on MCC)

U: SCC UL SF (PUSCH transmission is possible on SCC)

U: 10-SFs HARQ supportable U of SCC

FIG. 25

MCC: UD-cfg #6

| UD-cfg of SCC | SF number of MCC (UG timing of SCC) | | | | | | | | | |
|---|---|---|---|---|---|---|---|---|---|---|
| | 0 | 1 | 2 | 3 | 4 | 5 | 6 | 7 | 8 | 9 |
| #1 | | | 6 | U | U | | | 6 | U | U | 4 |
| #2 | | | 6 | U | | | | 6 | U | | |
| #3 | 4 | | U | U | U | | | 6 | | | 4 |
| #4 | | | U | U | | | | 6 | | | 4 |
| #5 | | | U | | | | | 6 | | | |

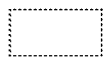 : MCC DL SF (UG / PHICH transmission is possible on MCC)

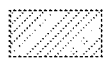 : MCC UL SF (No UG / PHICH transmission on MCC)

U: SCC UL SF (PUSCH transmission is possible on SCC)

U: 10-SFs HARQ supportable U of SCC

FIG. 26

| DU-cfg of MCC | SF number (UL grant timing of SCC) | | | | | | | | | |
|---|---|---|---|---|---|---|---|---|---|---|
| | 0 | 1 | 2 | 3 | 4 | 5 | 6 | 7 | 8 | 9 |
| #0 | 4 | 6 | | | | | 6 | | | |
| #1 | 4 | 6 | | | | | 6 | | | 4 |
| #2 | 4 | | | 4 | 4 | | | | 4 | 4 |
| #3 | | 6 | | | | | | | 4 | 4 |
| #4 | 4 | 6 | | | 4 | | | | 4 | 4 |
| #5 | 4 | | | 4 | 4 | | | | 4 | 4 |
| #6 | 4 | 6 | | | | | 6 | | | 4 |

☐ : MCC DL SF (UG / PHICH transmission is possible on MCC)

▨ : MCC UL SF (No UG / PHICH transmission on MCC)

FIG. 27

| DU-cfg of MCC | SF number (10-SFs HARQ supportable U of SCC) | | | | | | | | | |
|---|---|---|---|---|---|---|---|---|---|---|
| | 0 | 1 | 2 | 3 | 4 | 5 | 6 | 7 | 8 | 9 |
| #0 | | | 0 | | 0 | | | 0 | | |
| #1 | | | 0 | 0 | 0 | | | 0 | | |
| #2 | | | 0 | 0 | 0 | | | 0 | 0 | |
| #3 | | | 0 | 0 | | | | 0 | | |
| #4 | | | 0 | 0 | 0 | | | 0 | 0 | |
| #5 | | | 0 | 0 | 0 | | | 0 | 0 | |
| #6 | | | 0 | 0 | 0 | | | 0 | | |

0: 10-SFs HARQ supportable U of SCC

FIG. 28

| DU-cfg of MCC | SF number (UL grant timing of SCC) | | | | | | | | | |
|---|---|---|---|---|---|---|---|---|---|---|
| | 0 | 1 | 2 | 3 | 4 | 5 | 6 | 7 | 8 | 9 |
| #0 | 4 | 6 | | | | | 6 | | | |
| #1 | 4 | 6 | | | 4 | 4 | 6 | | | 4 |
| #2 | 4 | | | 4 | 4 | 4 | | | 4 | 4 |
| #3 | 4 | 6 | | | | 4 | | | 4 | 4 |
| #4 | 4 | 6 | | | 4 | 4 | | | 4 | 4 |
| #5 | 4 | | | 4 | 4 | 4 | | | 4 | 4 |
| #6 | 4 | 6 | | | | 4 | 6 | | | 4 |

☐ : MCC DL SF (UG / PHICH transmission is possible on MCC)

▨ : MCC UL SF (No UG / PHICH transmission on MCC)

FIG. 29

| DU-cfg of MCC | SF number (10-SFs HARQ supportable U of SCC) | | | | | | | | | |
|---|---|---|---|---|---|---|---|---|---|---|
| | 0 | 1 | 2 | 3 | 4 | 5 | 6 | 7 | 8 | 9 |
| #0 | | | 0 | | 0 | | | 0 | | |
| #1 | | | 0 | 0 | 0 | | | 0 | 0 | 0 |
| #2 | | | 0 | 0 | 0 | | | 0 | 0 | 0 |
| #3 | | | 0 | 0 | 0 | | | 0 | 0 | 0 |
| #4 | | | 0 | 0 | 0 | | | 0 | 0 | 0 |
| #5 | | | 0 | 0 | 0 | | | 0 | 0 | 0 |
| #6 | | | 0 | 0 | 0 | | | 0 | | 0 |

0: 10-SFs HARQ supportable U of SCC

METHOD FOR TRANSMITTING/RECEIVING SIGNAL AND DEVICE THEREFOR

CROSS-REFERENCE TO RELATED APPLICATIONS

This application is a continuation of U.S. patent application Ser. No. 14/665,971, filed on Mar. 23, 2015, now U.S. Pat. No. 9,277,553, which is a continuation of U.S. patent application Ser. No. 14/007,279, filed on Sep. 24, 2013, now U.S. Pat. No. 9,019,871, which is the National Stage filing under 35 U.S.C. 371 of International Application No. PCT/KR2012/002181, filed on Mar. 26, 2012, which claims the benefit of U.S. Provisional Application No. 61/466,939, filed on Mar. 24, 2011, 61/473,163, filed on Apr. 8, 2011, 61/473,162, filed on Apr. 8, 2011, 61/554,477, filed on Nov. 1, 2011, 61/560,792, filed on Nov. 16, 2011, 61/588,662, filed on Jan. 20, 2012, 61/596,208, filed on Feb. 7, 2012, 61/597,111, filed on Feb. 9, 2012, 61/603,888 filed on Feb. 27, 2012, and 61/603,954, filed on Feb. 28, 2012, the contents of which are all hereby incorporated by reference herein in their entirety.

TECHNICAL FIELD

The present invention relates to a wireless communication system, and more specifically, to a method for transmitting/receiving a signal in a multicarrier system supporting TDD (Time Division Duplex) and a device for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently transmitting/receiving a signal in a wireless communication system and a device for the same. Another object of the present invention is to provide a method for efficiently transmitting/receiving a signal in a multicarrier system supporting TDD and a device for the same. Another object of the present invention is to provide a method for reusing existing signal transmission/reception timing when signal transmission and reception timing is configured in a multicarrier system supporting TDD and a device for the same.

The technical problems solved by the present invention are not limited to the above technical problems and those skilled in the art may understand other technical problems from the following description.

Technical Solution

The object of the present invention can be achieved by providing a method for transmitting an uplink signal in a wireless communication system supporting carrier aggregation, the method including: configuring a first cell having a first TDD (Time Division Duplex) UL-DL (Uplink-Downlink) configuration and a second cell having a second TDD UL-DL configuration; receiving a PHICH (Physical HARQ Indicator Channel) signal in a subframe #(n−L) of the first cell or a PDCCH (Physical Downlink Control Channel) signal in a subframe #(n−K) of the first cell; and transmitting a PUSCH (Physical Uplink Shared Channel) signal in a subframe #n of the second cell, corresponding to the PHICH signal or the PDCCH signal, wherein the relationship among the subframes #(n−L), #(n−K) and #n is determined in consideration of a parameter value set in a specific TDD UL-DL configuration included in a TDD UL-DL configuration set, wherein the specific TDD UL-DL configuration corresponds to a TDD UL-DL configuration having a smallest number of UL subframes among one or more TDD UL-DL configurations in which one or more subframes configured as UL in the first cell or the second cell are all configured as UL, wherein, when the second cell is configured as UL, in a UL subframe (UU) located prior to the subframe #n according to the specific UL-DL configuration, the subframe #(n−L) is determined according to a parameter set to the UL subframe (UU), wherein, when the second cell is not set to UL in the UL subframe (UU), the subframe #(n−L) is determined according to a parameter value applied to a UL subframe prior to the subframe #n in the second cell, n is an integer greater than 0, and K and L are respectively integers equal to or greater than 1.

In another aspect of the present invention, provided herein is a communication device A communication device configured to transmit an uplink signal in a wireless communication system supporting carrier aggregation, the communication device including a radio frequency (RF) unit and a processor, wherein the processor is configured to configure a first cell having a first TDD UL-DL configuration and a second cell having a second TDD UL-DL configuration, to receive a PHICH signal in a subframe #(n−L) of the first cell or a PDCCH signal in a subframe #(n−K) of the first cell, and to transmit a PUSCH signal in a subframe #n of the second cell, corresponding to the PHICH signal or the PDCCH signal, wherein the relationship among the subframes #(n−L), #(n−K) and #n is determined in consideration of a parameter value set in a specific TDD UL-DL configuration included in a TDD UL-DL configuration set, wherein the specific TDD UL-DL configuration corresponds to a TDD UL-DL configuration having a smallest number of UL subframes among one or more TDD UL-DL configurations in which one or more subframes configured as UL in the first cell or the second cell are all configured as UL, wherein, when the second cell is configured as UL, located prior to the subframe #n in a UL subframe (UU) according to the specific UL-DL configuration, the subframe #(n−L) is determined according to a parameter set to the UL subframe (UU), wherein, when the second cell is not set to UL in the UL subframe (UU), the subframe #(n−L) is determined according to a parameter value applied to a UL subframe prior to the subframe #n in the second cell, n is an integer greater than 0, and K and L are respectively integers equal to or greater than 1.

The PHICH signal, the PDCCH signal and the PUSCH signal may correspond to the same HARQ process.

The subframes #(n−L), #(n−K) and #n may be allocated to the same HARQ process.

L may be identical to K when the second cell is configured as UL in the UU and L may be greater than K when the second cell is not configured as UL in the UL subframe UU.

When the second cell is not configured as UL in the UU, a process of receiving a PHICH signal and a UL grant PDCCH signal may be omitted in a DL subframe relating to the UU according to a parameter value set to the specific TDD UL-DL configuration.

The first cell may be a scheduling cell and the second cell may be a scheduled cell.

Advantageous Effects

According to the present invention, a signal can be efficiently transmitted/received in a wireless communication system. Furthermore, a signal can be efficiently transmitted/received in a multicarrier system supporting TDD. In addition, existing signal transmitting/receiving timing can be reused when signal transmitting/receiving timing is configured in a multicarrier system supporting TDD.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 2 illustrates a resource grid of a downlink slot;
FIG. 3 illustrates a downlink subframe structure;
FIG. 4 illustrates an uplink subframe structure;
FIGS. 14 to 16 illustrate an ACK/NACK timing setting and transmission method according to embodiment 1;
FIGS. 17 and 18 illustrate a UL grant/PHICH timing setting method according to embodiment 1;
FIG. 19 illustrates CA combinations to which ACK/NACK timing of embodiments 1 and 2 is applied;
FIG. 20 illustrates CA combinations which cause a problem in configuring UL HARQ timing;
FIGS. 21 to 25 illustrate a method for configuring UG or PHICH timing for SCC U according to embodiment 3;
FIGS. 26 to 29 illustrate a method for configuring UG or PHICH timing for SCC U according to embodiment 4.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

Figure 1:
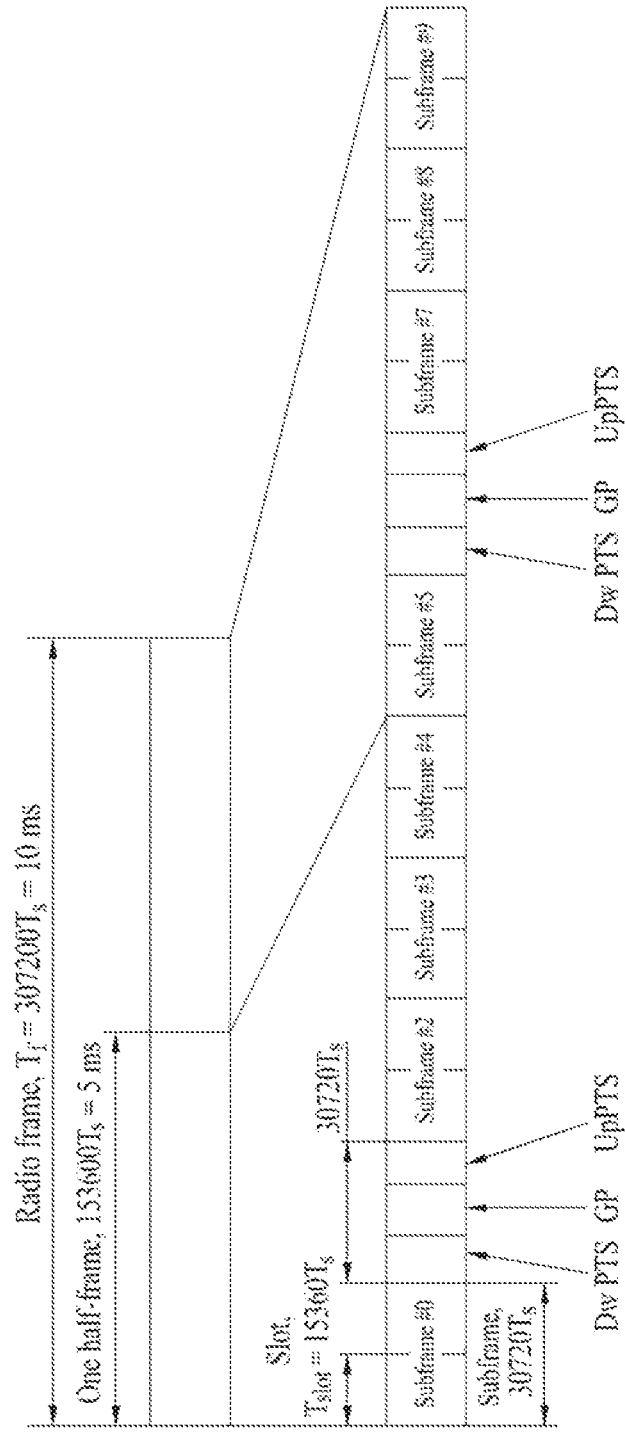
FIG. 1 illustrates a radio frame structure.

FIG. 1 illustrates a radio frame structure.

Referring to FIG. 1, a radio frame used in 3GPP LTE(-A) has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD (Frequency Division Duplex) mode, and thus the radio frame includes only one of a downlink subframe and an uplink subframe in a specific frequency band.

Particularly, FIG. 1 shows a radio frame structure for TDD, used in 3GPP LTE(-A). Table 1 shows UL-DL configurations of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | DwPTS | UpPTS Normal cyclic prefix in uplink | UpPTS Extended cyclic prefix in uplink | DwPTS | UpPTS Normal cyclic prefix in uplink | UpPTS Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A PDSCH is used to carry a transport block (TB) or a codeword (CW) corresponding to the TB. The TB means a data block transmitted from a MAC layer to a PHY layer through a transport channel. The codeword corresponds to a coded version of a TB. The corresponding relationship between the TB and the CW depends on swiping. In the specifically, the PDSCH, TB and CW are interchangeably used. Examples of downlink control channels used in LTE(-A) include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. A HARQ-ACK response includes positive ACK (simply, ACK), negative ACK (NACK), DTX (Discontinuous Transmission) or NACK/DTX. Here, HARQ-ACK is used with HARQ ACK/NACK and ACK/NACK interchangeably.

Control information transmitted through the PDCCH is referred to as downlink control information (DCI). The DCI includes resource allocation information for a UE or a UE group and other control information. For example, the DCI includes uplink/downlink scheduling information, an uplink transmit (Tx) power control command, etc. Transmission modes and information content of DCI formats for configuring a multi-antenna technology are as follows.

Transmission Mode
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO
Transmission mode 6: Closed-loop rank-1 precoding
Transmission mode 7: Transmission using UE-specific reference signals
DCI Format
Format 0: Resource grants for the PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments As described above, the PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

FIG. 4 illustrates an uplink subframe structure.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response to a downlink data packet (e.g. codeword) on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. A HARQ response includes positive ACK (simply, ACK), negative ACK (NACK), DTX (Discontinuous Transmission) or NACK/DTX. Here, HARQ-ACK is used with HARQ ACK/NACK and ACK/NACK interchangeably.

Channel State Information (CSI): This is feedback information about a downlink channel. MIMO (Multiple Input Multiple Output)-related feedback information includes a rank indicator (RI) and a precoding matrix indicator (PMI). 20 bits per subframe are used.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE-(-A).

TABLE 3

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

A description will be given of TDD signal transmission timing in a single carrier (or cell) situation with reference to FIGS. 5 to 10.

Figure 5:
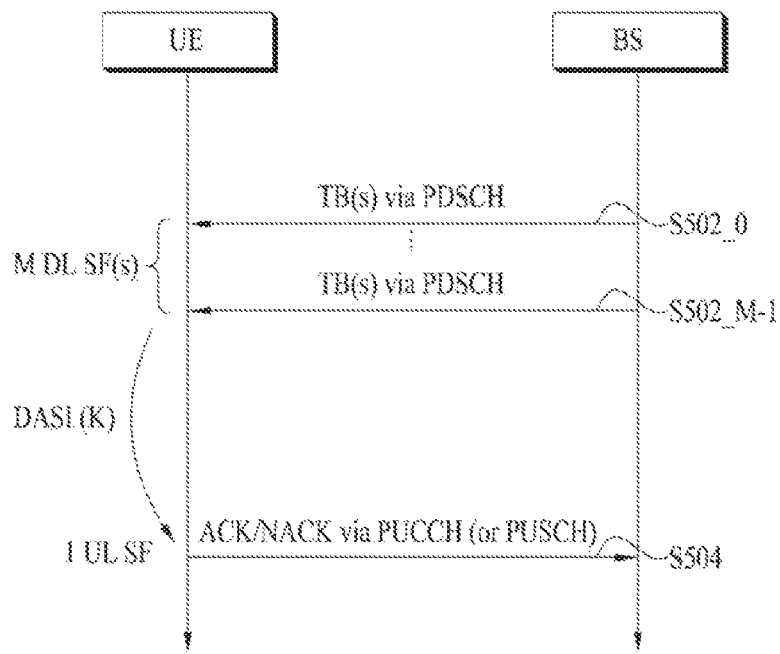
FIGS. 5 and 6 illustrate TDD UL ACK/NACK (Uplink Acknowledgement/Negative Acknowledgement) transmission timing in a single cell case.
Figure 6:
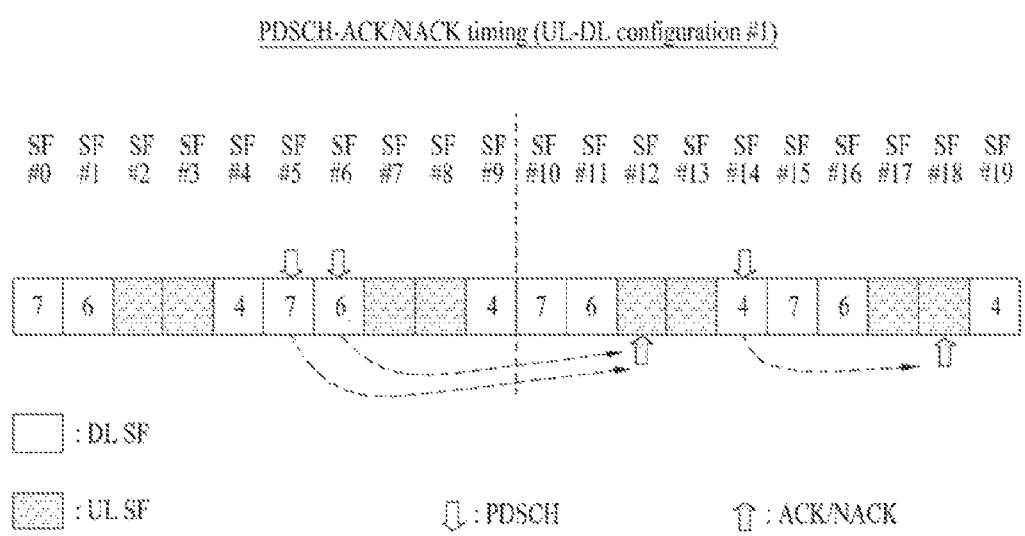

FIGS. 5 and 6 illustrate PDSCH-UL ACK/NACK timing. Here, UL ACK/NACK means ACK/NACK transmitted on uplink, as a response to DL data (e.g. PDSCH).

Referring to FIG. 5, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 3 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 4 shows DASI (K: {k0, k1, . . . , k−1}) defined in LTE(-A). Table 4 shows spacing between a UL subframe transmitting ACK/NACK and a DL subframe relating to the UL subframe. Specifically, when a PDCCH that indicates PDSCH transmission and/or SPS release is present in a subframe n−k (k∈K), the UE transmits ACK/NACK in a subframe n.

TABLE 4

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 8 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |

TABLE 4-continued

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 6 illustrates UL ACK/NACK transmission timing when UL-DL configuration #1 is configured. In the figure, SF#0 to #9 and SF#10 to #19 respectively correspond to radio frames, and numerals in blocks denote UL subframes relating to DL subframes. For example, ACK/NACK for a PDSCH of SF#5 is transmitted in SF#5+7 (=SF#12) and ACK/NACK for a PDSCH of SF#6 is transmitted in SF#6+6 (=SF#12). Accordingly, both ACKs/NACKs for DL signals of SF#5/#6 are transmitted in SF#12. Similarly, ACK/NACK for a PDSCH of SF#14 is transmitted in SF#14+4 (=SF#18).

Figure 7:
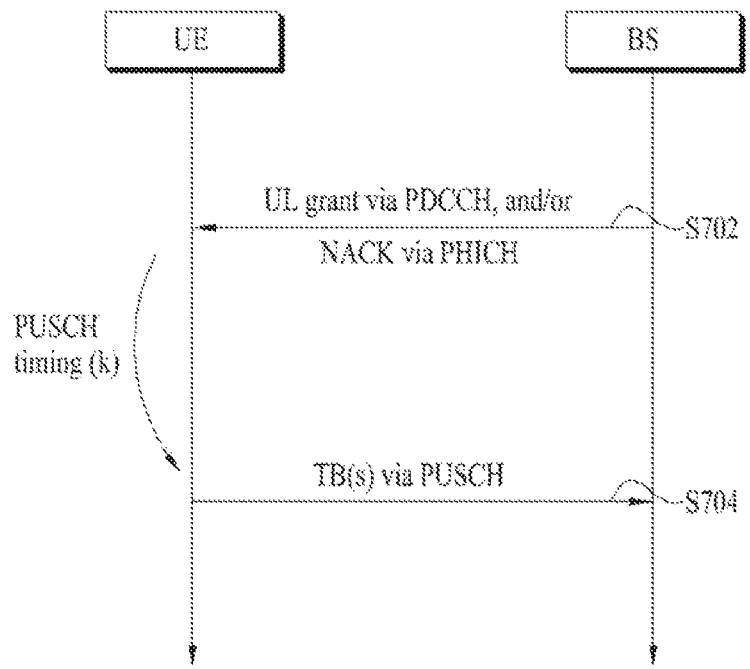
FIGS. 7 and 8 illustrate TDD PUSCH (Physical Uplink Shared Channel) transmission timing in a single cell case.
Figure 8:
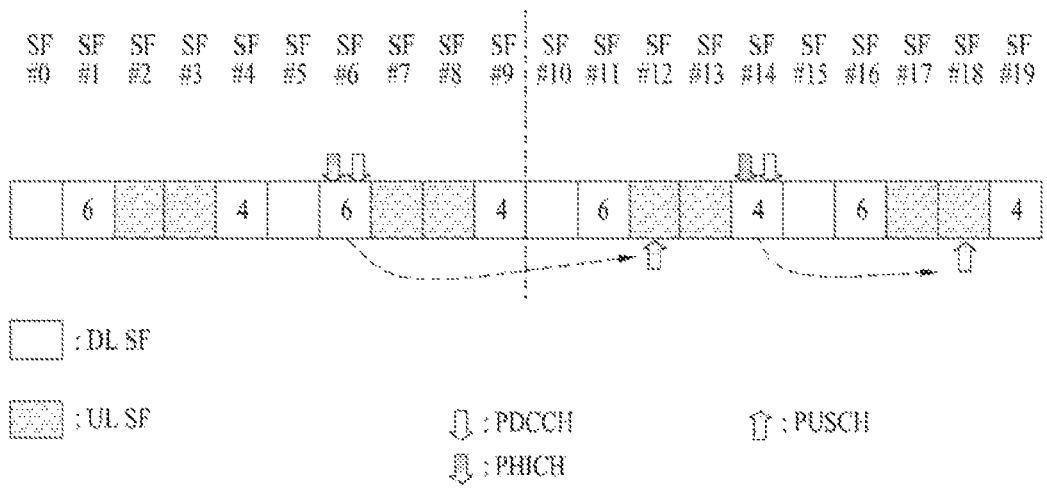

FIGS. 7 and 8 illustrate PHICH grant-PUSCH timing. A PUSCH can be transmitted corresponding to a PDCCH (UL grant) and/or a PHICH (NACK).

Referring to FIG. 7, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 5 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 5

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | | |
| 1 | | 6 | | | 4 | | | 6 | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

FIG. 8 illustrates PUSCH transmission timing when UL-DL configuration #1 is configured. In the figure, SF#0 to #9 and SF#10 to #19 respectively correspond to radio frames, and numerals in blocks denote UL subframes relating to DL subframes. For example, a PUSCH corresponding to PHICH/UL grant of SF#6 is transmitted in SF#6+6 (=SF#12) and a PUSCH corresponding to a PHICH/UL grant of SF#14 is transmitted in SF#14+4 (=SF#18).

Figure 9:
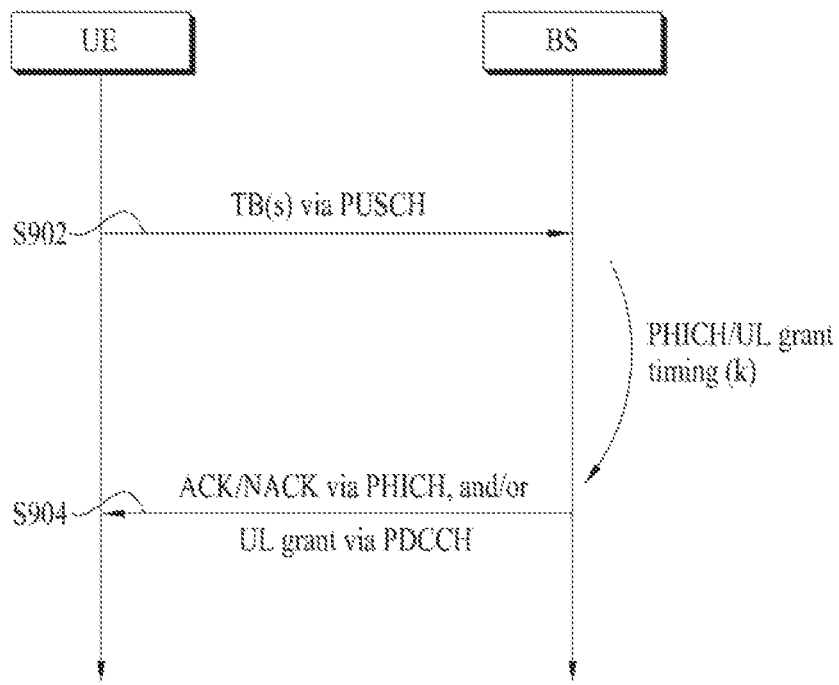
FIGS. 9 and 10 illustrate TDD DL ACK/NACK transmission timing in a single cell case.
Figure 10:
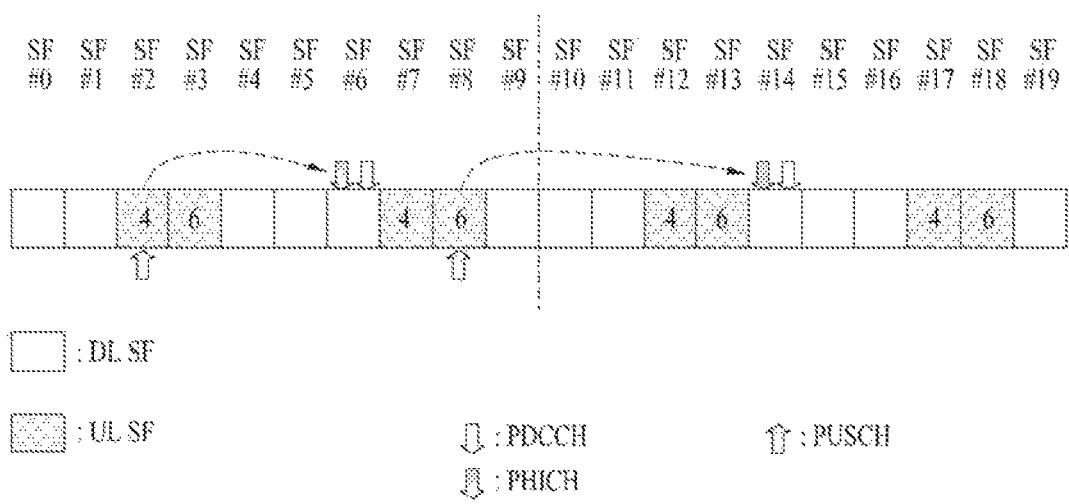

FIGS. 9 and 10 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 9, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 6 shows a UAI for PHICH/UL grant transmission in LTE(-A). Table 6 shows spacing between a DL subframe in which a PHICH/UL grant is present and a UL subframe relating to the DL subframe. Specifically, a PHICH/UL grant of a subframe i corresponds to PUSCH transmission through a subframe i–k.

TABLE 6

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | | 7 | 4 | | 6 |

FIG. 10 illustrates PHICH/UL grant transmission timing when UL-DL configuration #1 is configured. In the figure, SF#0 to #9 and SF#10 to #19 respectively correspond to radio frames, and numerals in blocks denote DL subframes relating to UL subframes. For example, a PHICH/UL grant corresponding to a PUSCH of SF#2 is transmitted in SF#2+4 (=SF#6) and a PHICH/UL grant corresponding to a PUSCH of SF#8 is transmitted in SF#8+6 (=SF#14).

PHICH resource allocation will now be described. When a PUSCH is transmitted in subframe #n, the UE determines a PHICH resource corresponding to the PUSCH in subframe #(n+$k_{PHICH}$). In case of FDD, $k_{PHICH}$ has a fixed value (e.g.

4). In case of TDD, $k_{PHICH}$ has a value depending on UL-DL configuration. Table 7 shows $k_{PHICH}$ for TDD is equivalent to Table 6.

TABLE 7

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

A description will be given of a HARQ process. The UE executes a plurality of parallel HARQ processes for UL transmission. The plurality of parallel HARQ processes is used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version.

In case of LTE(-A) FDD, the number of UL HARQ processes for non-subframe bundling operation (i.e. normal HARQ operation) is 8. In case of LTE(-A) TDD, the number of UL HARQ processes and HARQ RTT (Round Trip Time) are configured differently according to DL-UL configurations because the number of UL subframes depends on UL-DL configuration. Here, the HARQ RTT may be a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time.

The number of UL HARQ processes varies. When subframe bundling is applied, a bundle of PUSCHs configured of 4 contiguous UL subframes is transmitted in FDD and TDD. Accordingly, a HARQ operation/process when subframe bundling is applied is different from the normal HARQ operation/process.

Table 8 shows the number of synchronous UL HARQ processes and HARQ RTT in TDD. When the UL HARQ RTT is 10 [SFs or ms] (UL-DL configurations #1, #2, #3, #4 and #5), one UL HARQ process uses one fixed UL SF timing. When the UL HARQ RTT does not correspond to 10 [SFs or ms] (UL-DL configurations #0 and #6), one UL HARQ process uses a plurality of UL SF timings (instead of one fixed UL SF timing) while hopping. For example, in case of UL-DL configuration #6, PUSCH transmission timings in one UL HARQ process are: SF #2: PUSCH=>SF #13: PUSCH (RTT: 11 SFs)=>SF #24: PUSCH (RTT: 11 SFs)=>SF #37: PUSCH (RTT: 13 SFs)=>SF #48: PUSCH (RTT: 11 SFs)=>SF #52: PUSCH (RTT: 14 SFs).

TABLE 8

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

In case of TDD UL-DL configurations #1 to #6 and normal HARQ operation, the UE transmits a corresponding PUSCH signal in subframe n+k (refer to Table 5) according to UL grant PDCCH and/or PHICH information upon detection of the UL grant PDCCH and/or PHICH information in subframe n.

In case of TDD UL-DL configuration #0 and the normal HARQ operation, when a UL DCI grant PDCCH and/or a PHICH are detected from subframe n, PUSCH transmission timing of the UE is varied according to conditions. When the MSB (Most Significant bit) of a UL index in DCI is 1 or the PHICH is received through a resource corresponding to $I_{PHICH}=0$ in subframe #0 or #5, the UE transmits the corresponding PUSCH signal in subframe n+k (refer to Table 5). When the LSB (Least Significant bit) of the UL index in the DCI is 1, the PHICH is received through a resource corresponding to $I_{PHICH}=1$ in subframe #0 or #5, or the PHICH is received in subframe #1 or #6, UE transmits the corresponding PUSCH signal in subframe n+7. When both the MSB and LSB in the DCI are set, the UE transmits the corresponding PUSCH signal in subframe n+k (refer to Table 5) and subframe n+7.

Figure 11:
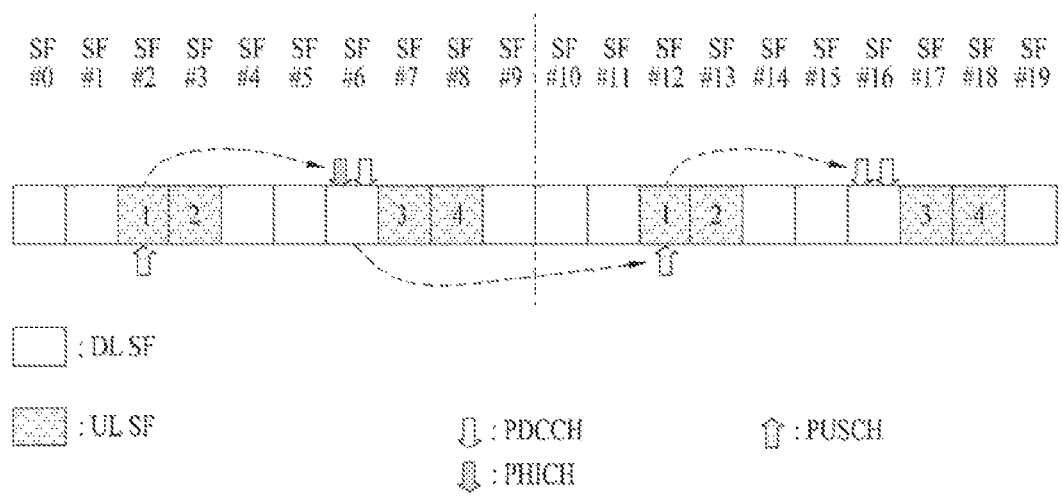
FIG. 11 illustrates a TDD HARQ (Hybrid Automatic Repeat request) process in a single cell situation.

FIG. 11 illustrates a synchronous UL HARQ process when UL-DL configuration #1 is configured. Numerals in blocks denote UL HARQ process numbers. The synchronous UL HARQ process shown in FIG. 11 corresponds to a normal HARQ process. Referring to FIG. 11, HARQ process #1 involves SF#2, SF#6, SF#12 and SF#16. For example, if an initial PUSCH signal (e.g. RV=0) is transmitted in SF#2, a UL grant PDCCH and/or a PHICH corresponding to the PUSCH signal can be received in SF#6 and a (retransmission) PUSCH signal (e.g. RV=2) corresponding to the initial PUSCH signal can be transmitted in SF#12. Accordingly, 4 UL HARQ processes having an RTT (Round Trip Time) of 10 SFs (or 10 ms) are present in case of UL-DL configuration #1.

Figure 12:
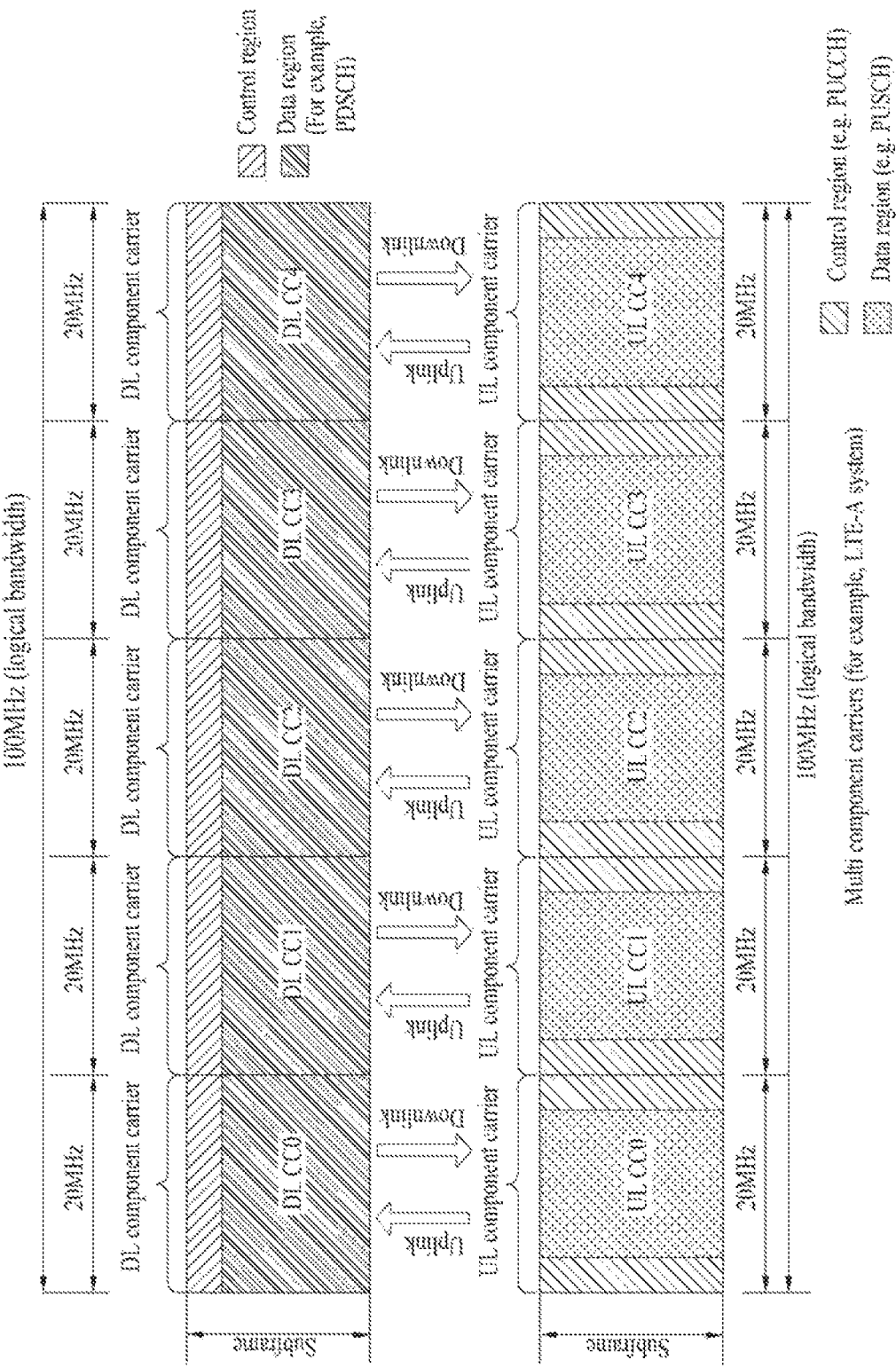
FIG. 12 illustrates a carrier aggregation (CA) communication system.

FIG. 12 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 12, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be configured cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell operating on a DL CC SIB2-linked to a UL CC. Furthermore, the PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not configured or which does not support CA. On the other hand, one or more serving cells exist, including a PCell and entire SCells, for a UE in an RRC_CONNECTED state, for which CA is configured. For CA, a network may configure one or more SCells in addition to an initially configured PCell, for a UE supporting CA during connection setup after an initial security activation operation is initiated.

Figure 13:
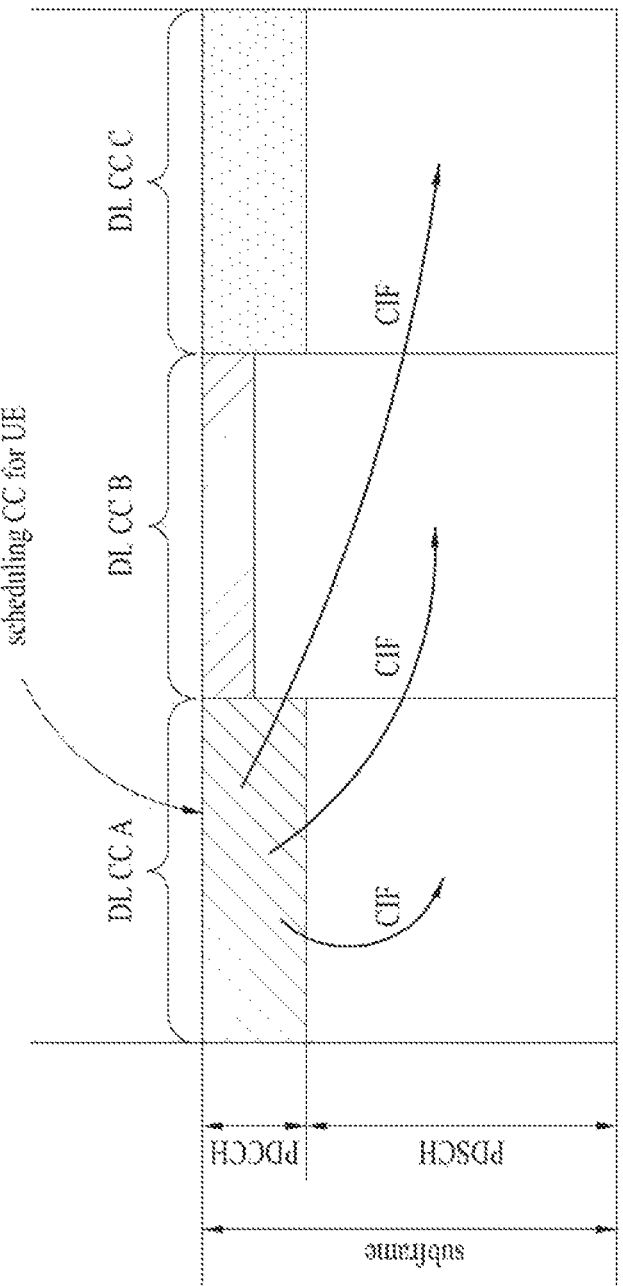
FIG. 13 illustrates scheduling in case of aggregation of a plurality of carriers.

FIG. 13 illustrates scheduling when a plurality of carriers is aggregated. It is assumed that 3 DL CCs are aggregated and DL CC A is configured as a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

A specific CC (or cell) used for PDCCH transmission is called a scheduling CC (or scheduling cell). The scheduling CC (or cell) may be used with a monitoring CC (or MCC) interchangeably. A CC (or cell) in which a PDSCH/PUSCH is scheduled by a PDCCH of another CC is called a scheduled CC (or scheduled cell). One or more scheduling CCs may be configured for one UE and one of the scheduling CCs may be used for DL control signaling and UL PUCCH transmission. That is, a scheduling CC includes a PCC. When only one scheduling CC is configured, the scheduling CC corresponds to the PCC. The scheduling CC/scheduled CC may also be called MCC/SCC in the following description.

When cross-CC scheduling is configured, CCs carrying signals are defined according to signal type as follows.

PDCCH (UL/DL grant): scheduling CC (or MCC)
PDSCH/PUSCH: CC indicated by a CIF of a PDCCH, detected from a scheduling CC
DL ACK/NACK (e.g. PHICH): scheduling CC (or MCC) (e.g. DL PCC)
UL ACK/NACK (e.g. PUCCH): UL PCC A conventional CA TDD system considers only a case in which aggregated CCs have the same UL-DL configuration. In this case, TDD signal transmission timing in a single cell situation, described with reference to FIGS. 5 to 10, can be used because all CCs have the same DL/UL subframe timing. However, a scheme for independently configuring UL-DL configurations for respective CCs in consideration of a UL/DL load difference and a channel state difference between CCs is under discussion recently. If a plurality of CCs has different UL-DL configurations when cross-CC scheduling is applied, however, the following problem may be generated in relation to signal transmission/reception timing. Furthermore, it may be necessary to define a new UL/DL ACK/NACK timing and/or UL/DL grant timing.

To solve the above-described problem, the present invention proposes a signal transmission timing (e.g. UL ACK/NACK transmission timing, UL grant transmission timing and DL ACK/NACK transmission timing) setting scheme in a system supporting CA and TDD. In addition, the present invention proposes a method of configuring a UL HARQ process according to signal transmission timing. In the following description, UL ACK/NACK is simply called ACK/NACK, a UL grant is called UG, and DL ACK/NACK is called a PHICH for convenience.

Here, ACK/NACK timing may mean a U configured to transmit ACK/NACK for DL data (e.g. a PDSCH) received through a specific D or mean a time interval between the D in which the DL data is received and the U in which ACK/NACK is transmitted. UG timing may mean a D configured to receive a UG that schedules UL data (e.g. a PUSCH) transmitted through a specific U or mean a time interval between the D in which the UG is received and the U in which the UL data is transmitted. PHICH timing may mean a D configured to receive ACK/NACK for UL data (e.g. a PUSCH) transmitted through a specific U or mean a time interval between the U in which the UL data is transmitted and the D in which ACK/NACK is received. ACK/NACK timing configured for a specific CC or specific UD-cfg corresponds to timing of Table 4, for example. UG timing configured for a specific CC or specific UD-cfg corresponds to timing of Table 5, for example. PHICH timing configured for a specific CC or specific UD-cfg corresponds to timings of Tables 6 and 7, for example.

In case of ACK/NACK, the proposed method described below can be applied irrespective of non-cross-CC scheduling and cross-CC scheduling. In case of UG or PHICH, the proposed method described below can be applied only when a cross-CC scheduling mode is configured or cross-CC scheduling is performed. For example, if a scheduling CC schedules only itself even though a cross-CC scheduling mode has been configured (i.e. non-cross-CC scheduling), the following method may not be used. In this case, TDD signal transmission timing configured for the scheduling CC can be applied.

In the following description, for easy understanding of the present invention, it is assumed that a PCC and an SCC having different UL-DL configurations are aggregated regarding ACK/NACK timing configuration. Furthermore, it is assumed that an MCC and an SCC having different UL-DL configurations are aggregated regarding UG or PHICH timing configuration. However, the proposed method described below is applicable to each of a plurality of SCCs having different UL-DL configurations. For example, when a PCC (in case of ACK/NACK timing) or an MCC (incase of UG or PHICH timing) and a plurality of SCCs having different UL-DL configurations are present, the proposed method described below can be independently applied to each SCC and the PCC or each SCC or the MCC.

In the following description, D denotes a DL SF, S denotes a special SF, and U denotes a UL SF. It is assumed that D or U is used as S and, unless otherwise specified, D is used as S. In addition, the unit of SF or ms may be called a TTI (Transmission Time Interval. A CC is used interchangeably with a cell (or serving cell) and a PCC and an SCC may be respectively used interchangeably with a PCell and an SCell.

In the following description, a signal transmission/reception process is performed by a UE. If a BS (or relay) performs the signal transmission/reception process, only a signal transmission/reception direction is changed and the same process as the signal transmission/reception process performed by the UE can be carried out by the BS.

Embodiment 1

Configuring Signal Transmission/Reception Timing

ACK/NACK Timing—Method 1-1

When a PCC and an SCC having different UL-DL configurations are aggregated, the following ACK/NACK timing setting rule can be considered. Method 1-1 may include a cross-SF scheduling operation during cross-CC scheduling. Here, cross-SF scheduling means scheduling of a DL data to be transmitted through DL SF #(n+k) (k>0) in DL SF #n.

ACK/NACK for DL data received through PCC
   ACK/NACK timing of PCC can be applied.
     Misalignment between a BS and a UE can be prevented at least for the ACK/NACK timing of the PCC during reconfiguration into a single CC from multi-CC (or reconfiguration into multi-CC from a single CC).

ACK/NACK for DL data received through SCC
   First, UL-DL configuration(s), in which SF(s) corresponding to SF(s) where both the PCC and SCC are U is all configured as U, can be selected from among all UL-DL configurations (e.g. Table 1). Then, a UL-DL configuration having a smallest number of Us (equivalently, a largest number of Ds) is selected from the selected UL-DL configuration(s), and ACK/NACK timing configured thereto can be applied. Equivalently, UL-DL configuration(s), in which SF(s) corresponding to SF(s) where either the PCC or the SCC is D is all configured as D, can be selected from all the UL-DL configurations. Then, a UL-DL configuration (referred to as "DL union" hereinafter) having a smallest number of Ds (equivalently, a largest number of Us) is selected from among the selected UL-DL configuration(s), and ACK/NACK timing (referred to as "common ACK/NACK timing" hereinafter) configured for the DL union can be applied.
     In case of the DL union, D/U is configured such that ACK/NACK timing for D of the SCC can be configured to U of the PCC.
     Preferably, only ACK/NACK timing of D having the same SF timing as D of the SCC can be extracted from the DL union and applied.

The common ACK/NACK timing can be applied to all DL data received through the PCC and the SCC.

FIGS. 14 and 15 illustrate an ACK/NACK timing setting scheme according to the present embodiment. It is assumed that the PCC and the MCC are identical and thus the MCC is also denoted as a PCC. In addition, UL-DL configuration is represented as UD-cfg.

FIG. 14 illustrates a case in which the PCC and the SCC respectively correspond to UD-cfg #3 and UD-cfg#6. In this case, method 1-1 is applied as follows.

ACK/NACK for DL data received through the PCC
   ACK/NACK timing of the PCC (i.e. UD-cfg #3) can be applied.
ACK/NACK for DL data received through the SCC
   ACK/NACK timing configured for UD-cfg (i.e. UD-cfg#3)(*) having a smallest number of Us among UD-cfgs (i.e. UD-cfgs #0, #3 and #6), in which SFs (i.e. SFs #2, #3 and #4) where both the PCC and the SCC are U are all configured as U, can be applied (refer to FIG. 14(a)). Equivalently, ACK/NACK timing configured for UD-cfg (i.e. UD-cfg#3)(*) having a smallest number of Ds among UD-cfgs (i.e. UD-cfgs #3, #4 and #5), in which SFs (i.e. SFs #0, #1, #5, #6, #7, #8 and #9) where either the PCC or the SCC is D is all configured as D, can be applied (refer to FIG. 14(b)).

FIG. 15 illustrates a case in which the PCC and the SCC respectively correspond to UD-cfg #2 and UD-cfg#4. In this case, method 1-1 is applied as follows.

ACK/NACK for DL data received through the PCC
   ACK/NACK timing of the PCC (i.e. UD-cfg #2) can be applied.
ACK/NACK for DL data received through the SCC
   ACK/NACK timing configured for UD-cfg (i.e. UD-cfg#5)(*) having a smallest number of Us among UD-cfgs (i.e. UD-cfgs #0 to #6), in which SF(s) (i.e. SF #2) where both the PCC and the SCC are U is all configured as U, can be applied (refer to FIG. 15(a)). Equivalently, ACK/NACK timing configured for UD-cfg (i.e. UD-cfg#5)(*) having a smallest number of Ds among UD-cfg (i.e. UD-cfg #5), in which SFs (i.e. SFs #0, #1 and #3 to #9) where either the PCC or the SCC is D are all configured as D, can be applied (refer to FIG. 15(b)).

ACK/NACK Timing—Method 1-2

When a plurality of CCs (e.g. a PCC, an MCC and an SCC; PCC (=MCC) and an SCC) having different TDD UL-DL configurations are aggregated, the following ACK/NACK timing setting rule can be considered in order not to introduce an additional cross-SF scheduling operation during cross-CC scheduling.

[Alt 0]
ACK/NACK for DL data received through the PCC
   ACK/NACK timing of the PCC can be applied.
ACK/NACK for DL data received through the SCC
   Non-cross-CC scheduling: ACK/NACK timing configured for DL union (Method 1-1) of the PCC and SCC can be applied.
   Cross-CC scheduling: A virtual UL-DL configuration, in which SFs where an SCC or an MCC configured to cross-CC-schedule the SCC is U are all configured as U, and the other SFs (i.e. SFs for which both the corresponding 2 CCs are configured as D) are all configured as D, is defined as "ULU-cfg". Finally, ACK/NACK timing configured for a DL union of the PCC and ULU-cfg can be applied.

Scheduling for D of the SCC can be skipped in an SF (hereinafter, a collided SF), in which the MCC configured to cross-CC-schedule the SCC is U and the SCC is D. In this case, the UE can omit a procedure (e.g. search space monitoring and blind decoding of PDCCH candidates) for receiving a DL grant DCI format regarding the SCC in the collided SF.

[Alt 1]
ACK/NACK for DL data received through the PCC
   ACK/NACK timing of the PCC can be applied.
ACK/NACK for DL data received through the SCC
   Non-cross-CC scheduling: ACK/NACK timing configured for a DL union of the PCC and the SCC can be applied.
   Cross-CC scheduling: ACK/NACK timing configured for a DL union of the MCC configured to cross-CC-schedule the SCC and the PCC can be applied.
Scheduling for D of the SCC can be skipped in a collided SF, in which the MCC configured to cross-CC-schedule the SCC is U and the SCC is D. In this case, the UE can omit a procedure (e.g. search space monitoring and blind decoding of PDCCH candidates) for receiving a DL grant DCI format regarding the SCC in the collided SF.

[Alt 2]
ACK/NACK for DL data received through the PCC
   ACK/NACK timing of the PCC can be applied.
ACK/NACK for DL data received through the SCC
   Non-cross-CC scheduling: ACK/NACK timing configured for a DL union of the PCC and the SCC can be applied.
   Cross-CC scheduling: ACK/NACK timing of the PCC can be applied.
Scheduling for D of the SCC can be skipped in a collided SF, in which an MCC configured to cross-CC-schedule the PCC or the SCC is U and the SCC is D. In this case, the UE can omit a procedure (e.g. search space monitoring and blind decoding of PDCCH candidates) for receiving a DL grant DCI format regarding the SCC in the collided SF.

When ACK/NACK timing is configured using Methods 1-1 and 1-2 (or other methods), ACK/NACK bit/number to be transmitted may be configured differently according to Us of the PCC. In this case, it is possible to consider configuring/applying different PUCCH resources/formats (e.g. PUCCH format 1a/1b and PUCCH format 3) and/or different transmission schemes (e.g. multi-bit ACK/NACK coding and ACK/NACK selection) for ACK/NACK transmitted through each of Us of the PCC in order to efficiently use ACK/NACK transmission resources.

For example, ACKs/NACKs for the PCC and the SCC can be simultaneously transmitted through a specific U (e.g. PCC-U1) of the PCC, whereas only ACK/NACK for the PCC can be transmitted through another specific U (e.g. PCC-U2) of the PCC. Here, different PUCCH resources and/or different transmission schemes (e.g. PUCCH formats) may be applied to ACKs/NACKs transmitted through PCC-U1 and PCC-U2. Specifically, multi-bit ACK/NACK coding scheme using an explicit PUCCH resource (e.g. PUCCH format 3) can be applied to ACK/NACK transmitted through PCC-U1, and an ACK/NACK selection scheme using an implicit PUCCH resource (e.g. PUCCH format 1a/1b) can be applied to ACK/NACK transmitted through PCC-U2. That is, PUCCH formats and resource allocation schemes can be respectively determined for a case in which ACKs/NACKs for N (e.g. N=2) or more CCs are transmitted through a specific U of the PCC, and for a case in which ACK/NACK for less than N CCs is transmitted through a specific U of the PCC.

FIG. 16 illustrates a procedure of transmitting ACK/NACK according to the above proposed method. Referring to FIG. 16, the UE generates ACK/NACK information upon reception of DL data (e.g. a PDSCH) (S1602). Then, the UE performs PUCCH resource allocation to transmit the ACK/NACK information in subframe #n (S1604). Here, PUCCH resource allocation is determined in consideration of that ACK/NACK information for how many (N) CCs is to be transmitted in subframe #n. For example, when N is 1, the ACK/NACK information can be transmitted through PUCCH format 1a/1b (implicit resource) (S1606). When N is 2 or more, the ACK/NACK information can be transmitted through PUCCH format 3 (explicit resource) (S1606).

UL Grant (UG) or PHICH Timing—Method 1-3

When an MCC and an SCC having different UL-DL configurations are aggregated, the following UG or PHICH timing setting rule can be considered.

UG or PHICH for UL data transmitted through the MCC
   UG or PHICH timing of the MCC can be applied.
   Misalignment between the BS and the UE can be prevented at least for the UG or PHICH timing of the MCC during reconfiguration into the non-cross CC scheduling mode from the cross-CC scheduling mode (or reconfiguration into the cross-CC scheduling mode from the non-cross-CC scheduling mode).
UG or PHICH for UL data transmitted through the SCC
   First, UL-DL configuration(s), in which SF(s) where either the MCC or the SCC is U is all configured as U, can be selected from all UL-DL configurations. Then, a UL-DL configuration (referred to as "UL union") having a smallest number of Us (equivalently, a largest number of Ds) is selected from the selected UL-DL-configuration(s), and UG or PHICH timing ("common UG or PHICH timing) configured for the UL union can be applied.
   In case of the UL union, D/U is configured such that UG or PHICH timing for all Us of the SCC can be configured to D of the MCC.
   Preferably, only UG or PHICH timing of U having the same SF timing as U of the SCC can be extracted from the UL union and applied.
The common ACK/NACK timing can be applied to all UL data transmitted through the MCC and the SCC.

When UG or PHICH timing is configured using Method 1-3 (or other methods), a specific D (e.g. MCC-D1) of the MCC, which is not configured to transmit a UG or PHICH when the MCC operates alone, can be configured as UG or PHICH timing for PUSCH transmission in a specific U of the MCC/SCC. For convenience, a U of the MCC/SCC corresponding to MCC-D1 configured as UG or PHICH timing is called an orphan U. Here, MCC-D1 can be identified with reference to Tables 1, 6 and 7. In this case, the orphan U (or all Us of a CC including the orphan U) can be used for one-time PUSCH scheduling/transmission depending only on instantaneous UG (without involving a PHICH based HARQ process). Here, one-time PUSCH transmission means, although a HARQ process is accompanied without a PHICH, to perform only UL grant based (adaptive) retransmission without non-adaptive retransmission. For example, one-time PUSCH transmission can be used to carry UL data and/or UCI (e.g. ACK/NACK and/or CQI/PMI/RI, etc.) (which do not involve a PHICH based HARQ process). Otherwise, a scheme of limiting PUSCH scheduling/transmission for the orphan U (or all Us of the CC including the orphan U) and using the orphan U for other purposes (e.g. PUCCH and/or SRS and/or PRACH transmission) can be considered. In this case, the UE can omit a procedure (e.g. search space monitoring and blind decoding of PDCCH candidates) for receiving a UL grant DCI format in the D (i.e. MCC-D1) of the MCC, which corresponds to the orphan U.

FIGS. 17 and 18 illustrate a UG/PHICH timing setting scheme according to the present embodiment. It is assumed that a PCC and an MCC are identical and thus the MCC is also denoted as a PCC. In addition, UL-DL configuration is represented as UD-cfg.

FIG. 17 illustrates a case in which the PCC and the SCC respectively correspond to UD-cfg #3 and UD-cfg#6. In this case, the proposed method described above is applied as follows.
UG or PHICH for UL data transmitted through the PCC
UG or PHICH timing of the PCC (i.e. UD-cfg #3) can be applied.
UG or PHICH for UL data transmitted through the SCC
UG or PHICH timing configured for UD-cfg (i.e. UD-cfg#6)(*) having a smallest number of Us among UD-cfgs (i.e. UD-cfgs #0 and #6), in which SFs (i.e. SFs #2, #3, #4, #7 and #8) where either the PCC or the SCC is U are all configured as U, can be applied.

FIG. 18 illustrates a case in which the PCC and the SCC respectively correspond to UD-cfg #2 and UD-cfg#4. In this case, the proposed method described above is applied as follows.
UG or PHICH for UL data transmitted through the PCC
UG or PHICH timing of the PCC (i.e. UD-cfg #2) can be applied.
UG or PHICH for UL data transmitted through the SCC
UG or PHICH timing configured for UD-cfg (i.e. UD-cfg#1)(*) having a smallest number of Us among UD-cfgs (i.e. UD-cfgs #0, #1 and #6), in which SF(s) (i.e. SFs #2, #3 and #7) where either the PCC or the SCC is U are all configured as U, can be applied.

Embodiment 2

Configuring Signal Transmission/Reception Timing

When the method of embodiment 1 is applied, ACK/NACK timing, UG timing and PHICH timing can be determined according to a UD-cfg that is not set to any of aggregated CCs (e.g. PCC and SCC). However, in view of D or U, one of UD-cfg of the PCC and UD-cfg of the SCC is included in the other (that is, a nested structure is employed), ACK/NACK timing, UG timing and PHICH timing follow timing set to either UD-cfg of the PCC or SCC when the method of embodiment 1 is applied. Accordingly, when a plurality of CCs is aggregated and have a nested relationship, the timing setting process of embodiment 1 can be simplified.

Specifically, embodiment 1 can be applied to CA combinations (CA of UD-cfgs #1 and #3, CA of UD-cfgs #2 and #3 and CA of UD-cfgs #2 and #4) corresponding to shaded parts of FIG. 19 and the proposed method described below can be applied to the other CA combinations.
ACK/NACK Timing—Method 2-1
ACK/NACK for DL data received through the PCC
ACK/NACK timing configured for the PCC can be applied.
ACK/NACK for DL data received through the SCC
ACK/NACK timing (i.e. "common ACK/NACK timing") configured for one of the PCC and SCC, which has a smaller number of Us (equivalently, a larger number of Ds) can be applied.
Preferably, only ACK/NACK timing of D having the same SF timing as D of the SCC in UD-cfg of the selected CC can be extracted and applied.
The common ACK/NACK timing can be commonly applied to all DL data received through the PCC and SCC.
UG or PHICH Timing—Method 2-2
UG or PHICH for UL data transmitted through an MCC
UG or PHICH timing of the MCC can be applied.
UG or PHICH for UL data transmitted through an SCC
UG or PHICH timing (i.e. "common UG or PHICH timing") configured for one of the MCC and SCC, which has a larger number of Us (equivalently, a smaller number of Ds) can be applied.
Preferably, only UG or PHICH timing of U having the same SF timing as U of the SCC in UD-cfg of the selected CC can be extracted and applied.
The common UG or PHICH timing can be commonly applied to all DL data received through the MCC and SCC.

Embodiment 3

Signal Transmission/Reception Timing and UL HARQ Process

As described above with reference to Table 8, the number of UL SFs is defined differently according to UL-DL configuration in case of TDD, and the number of UL HARQ processes and a UL HARQ RTT based on the number of UL SFs can be configured differently according to UL-DL configuration.

When the UG or PHICH timing allocation schemes of embodiments 1 and 2 are applied, in a specific combination of MCC/SCC, UG or PHICH timing of UD-cfg having a UL HARQ RTT different from a UL HARQ RTT configured for the MCC/SCC may be applied. For example, if the MCC corresponds to UD-cfg #6 and the SCC corresponds to UD-cfg #1 (having a UL HARQ RTT of 10 SFs or 10 ms), UG or PHICH timing and a UL HARQ RTT (which is not 10 SFs or 10 ms) configured for UD-cfg #6 are applied to SCC U when the proposed methods of embodiments 1 and 2 are applied, and thus a problem may occur in configuring the entire UL HARQ timing.

FIG. 20 illustrates CA combinations in which a problem occurs in configuring UL HARQ timing, when UG or PHICH timing allocation schemes of embodiments 1 and 2 are applied. In FIG. 20, shaded parts correspond to CA combinations in which a problem occurs in configuring UL HARQ timing. An MCC/SCC combination corresponding to a shaded part is called "non-applicable MCC/SCC-comb". Other MCC/SCC combinations are called an applicable MS-comb. FIG. 20(a) shows a case in which UG or PHICH timing of the MCC is applied to the MCC and common UG or PHICH timing is applied to the SCC. FIG. 20(b) shows a case in which common UG or PHICH timing is applied to both the MCC and SCC.

Accordingly, the above-described UG or PHICH timing setting method is applied to the applicable MS-comb and the following method can be considered for the non-applicable MS-comb.

0) While UG or PHICH timing setting methods of embodiments 1 and 2 are applied, the UL HARQ RTT is changed to N*10 SFs or N*10 ms (N being an integer greater than 1, preferably 1 or 2) on the basis of the following method 3-0 or 3-0-1 only for a CC to which common UG or PHICH timing is applied,
  1) cross-CC scheduling may not be permitted (for both DL and UL or only for UL),
  2) carrier aggregation may not be permitted (for both DL and UL or only for UL),
  3) UL data scheduling/transmission for a corresponding SCC may be skipped or dropped when cross-CC scheduling is configured,
  4) a UG or PHICH timing setting scheme based on the following method 3-1 may be applied, or
  5) a UG or PHICH timing setting scheme based on the following method 3-2 may be applied.
  HARQ Process Configuration—Method 3-0
  UG/PHICH=>PUSCH timing relation (a time difference therebetween is referred to as K SFs or K ms for convenience) can follow the UG or PHICH timing of embodiments 1 and 2.
  PUSCH=>PHICH/UG timing relation (a time difference therebetween is referred to as L SFs or L ms for convenience) can be configured such that a time required for UG/PHICH=>PUSCH=>UG/PHICH corresponds to N*10 SFs or N*10 ms. Here, N is an integer equal to or greater than 1, preferably, 1 or 2. That is, L can be configured as N*10−K.
  HARQ Process Configuration—Method 3-0-1
  UG=>PUSCH timing relation (a time difference therebetween is referred to as K SFs or K ms for convenience) can be configured by applying the common UG or PHICH timing of embodiments 1 and 2 to PUSCH transmission in SF #n.
  PUSCH=>PHICH timing relation (a time difference therebetween is referred to as L SFs or L ms for convenience) can be configured by applying the common UG or PHICH timing of embodiments 1 and 2 to PUSCH transmission in SF #n.
  Finally, PHICH=>UG timing can be configured such that PUSCH transmission at an interval of N*10 SFs or N*10 ms configures a same PUSCH HARQ process. That is, the time difference between a PHICH and a UG can be configured as H=N*10−K−L (instead of 0).
  For example, a PUSCH in SF #N, a PHICH in SF #(n+L), a UG in SF #(n+L+(N*10−K−L))=SF #(n+N*10−K), and a PUSCH in SF #(n+N*10−K+K)=SF #(n+N*10) can be allocated such that they configure the same PUSCH HARQ process.
  Accordingly, in a view of PUSCH transmission, the UE can receive a PHICH in an MCC corresponding to SF #(n−K−(N*10−K−L))=#(n−K−H)=#(n−L)=#(n−(N*10−L)) and/or transmit a PUSCH in an SCC corresponding to SF #n when a UL grant is received in an MCC corresponding to SF #(n−K). Whether the PUSCH is initially transmitted or retransmitted can be determined according to reception/non-reception of the PHICH, content of the UL grant (e.g. whether an NDI (New Data Indicator is toggled).
  For reference, applications of Method 3-0-1 are described. When DU-cfg #6 is determined as UL union according to the UG or PHICH timing setting schemes based on embodiments 1 and 2, UL grant/PHICH timing based on 20 [TTI] UL HARQ RTT for PUSCH transmission in SF #3 can be configured with reference to Tables 5, 6 and 7 as follows. The unit of TTI may be SF or ms.
  UL=>PUSCH timing relation, that is, a time interval K [TTI] can be determined by applying UL union timing, that is, UL grant/PHICH timing configured for UD-cfg #6 to PUSCH transmission in SF #3.
  Referring to Table 5, a timing difference between a UL grant in SF #6 and a PUSCH in SF #(10+3) corresponds to L=7 [TTI].
  PUSCH=>PHICH timing relation, that is, a time interval L [TTI] can be determined by applying UL union timing, that is, UL grant/PHICH timing configured for UD-cfg #6 to PUSCH transmission in SF #3.
  Referring to Table 7, a timing difference between a PHICH in SF #3 and a PHICH in SF #9 corresponds to L=6 [TTI].
  PHICH=>UL grant timing relation, that is, a time interval 20−K−L [TTI] can be determined such that PUSCH transmissions in SF #3 at intervals of 20 [TTI] configure the same PUSCH HARQ process.
  PHICH=>UL grant timing interval becomes 20−K−L=20−7−6=7 [TTI] according to the above results.
  Consequently, the PUSCH in SF #3, the PHICH in SF #(3+L)=SF #9, a UL grant in SF #(9+(20−K−L))=SF #16, a PUSCH in SF #(16+K)=SF #23 can be allocated such that they configure the same PUSCH HARQ process.
  HARQ Process Configuration—Method 3-1
  UG or PHICH for PUSCH transmission in MCC U
  UG or PHICH timing of an MCC can be applied.
  UG or PHICH for PUSCH transmission in SCC U (i.e. SF #n)
  UG timing (hereinafter, SF #UG): this can be configured as a D of an MCC closest to SF #(n−p) or SF #n present prior to SF #(n−p). Here, p is an integer equal to or greater than 1, preferably, 4.
  PHICH timing (hereinafter, SF #PH): this can be configured as a D of an MCC corresponding to a time after N*10 SFs or N*10 ms from UG timing, that is, SF #(UG+N*10).
  In case of n−UG>10−p (e.g. 6): synchronous HARQ having a HARQ RTT of 10 SFs or 10 ms cannot be supported for an SCC U corresponding to SF #n because PH−n<p (e.g. 4). Accordingly, the following scheme can be considered for the SCC U.
  Alt 0) Method 3-0, 3-0-1 or 3-2 can be applied.
  Alt 1) Synchronous HARQ having a HARQ RTT of 20 SFs or 20 ms can be supported by respectively configuring UG timing and PHICH timing to SF #UG and SF #(UG+20).
  Alt 2) Only the UG timing is configured as SF #UG (that is, PHICH timing is not configured) and SF #n can be used for one-time PUSCH scheduling/transmission depending only on an instantaneous UG (without an accompanying a PHICH based HARQ process). Here, one-time PHICH transmission serves to perform only UL grant based (adaptive) retransmission without non-adaptive retransmission, which involves a HARQ process without a PHICH. For example, one-time PUSCH transmission can be used to carry UL data and/or UCI (e.g. ACK/NACK and/or CQI/PMI/R, etc.) (which do not involve a PHICH based HARQ process).
  Alt 3) PUSCH scheduling/transmission for the SCC U corresponding to SF #n can be limited and the SCC U corresponding to SF #n can be used for other purposes (e.g. PUCCH and/or SRS and/or PRACH transmission).
  HARQ Process Configuration—Method 3-2
  The UG or PHICH timing setting methods (e.g. UL union) of embodiments 1 and 2 are applied only to a CC (e.g. SCC) to which the common UG or PHICH timing is applied such that UL data transmission in an SCC D or S can be skipped when the SCC D or S is included in a plurality of UL SF timings that one UL HARQ process uses while hopping. To achieve this, it is possible to omit UG (and/or PHICH) scheduling/reception for UL data transmission in an MCC DL SF (transmitting a UG that schedules a PUSCH at corresponding SF timing and ACK/NACK (PHICH) for the PUSCH at the corresponding SF timing) corresponding to the SCC D or S.

That is, a plurality of SCC UL timings that a UL HARQ process uses while hopping is connected on the basis of UL union timing, and transmission of data (e.g. PUSCH) and transmission and reception of control information (e.g. PHICH/UG) relating thereto at a UL timing that does not correspond to the SCC can be skipped (on UL union timing). When the control information is skipped, connection of SCC ULs in a UL HARQ process may be performed using UL union PHICH timing corresponding to previous SCC UL and UL union UG timing corresponding to the following SCC UL (here, the previous and following SCC ULs may not be contiguous in terms of UL union (HARQ) timing). For example, HARQ processes can be connected in the order of SCC PUSCH transmission in the previous SCC UL=>PHICH reception at UL union PHICH timing corresponding to the previous SCC UL (MCC)=>UL grant reception at UL union UL grant timing corresponding to the following SCC UL (MCC)=>SCC PUSCH transmission in the following SCC UL (here, PHICH/UL grant scheduling/reception for UL in a UL union between the previous SCC UL and the following SCC UL is omitted). In other cases (i.e. when the above-mentioned skipping operation is not present), connection of SCC ULs in a UL HARQ process may be performed using PHICH timing for previous UL in the UL union and UG timing that schedules the following UL in the UL union. Here, the previous and following ULs may be contiguous in terms of UL union (HARQ) timing. For example, HARQ processes can be connected in the order of SCC PUSCH transmission in the previous UL in UL union=>PHICH reception at PHICH timing corresponding to the previous UL in the UL union (MCC)=>UL grant reception at UL grant timing corresponding to the following UL in the UL union (MCC)=>SCC PUSCH transmission in the following UL in the UL union. Here, the previous and following SCC ULs are contiguous in terms of UL union (HARQ) timing, and thus PHICH/UL grant scheduling/reception relating to the previous and following SCC ULs is not omitted.

That is, UL grant or PHICH timing (i.e. UL union timing) defined in UD-cfg corresponding to a UL union of the MCC and SCC can be applied to perform PUSCH transmission (and PHICH/UL grant transmission) relating to a specific PUSCH HARQ process of the SCC over time. However, when specific PUSCH transmission timing (U1) defined in UD-cfg corresponding to the UL union is not defined as a UL SF in the SCC, PUSCH transmission that needs to be performed through U1 can be executed through the first SCC UL SF (U2) available after U1. Here, it is assumed a UL SF (for the SCC) in which PUSCH transmission can be performed immediately before U1 based on the UL union timing is U0. In this case, PUSCH HARQ related operations can be performed in the order of PUSCH transmission in U0, PHICH reception at PHICH timing (D0) (at which ACK/NACK for a PUSCH is transmitted) with respect to transmission of the PUSCH in U0, UL grant reception at UL grant timing (D2) for scheduling a PUSCH in U2 and PUSCH transmission in U2. Here, D0 and D2 may be identical or different according to UL union timing. D2 may include D0 and may be defined as D2 SF timing (e.g. UG timing) (valid in terms of UL union timing) closest to D0 after D0.

The method of the present embodiment is exemplified. If UD-cfg #6 corresponds to an MCC and UD-cfg #1 corresponds to an SCC, SFs #2, #3, #4, #7 and #8 are UL SFs in case of the MCC and SFs #2, #3, #7 and #8 are UL SFs in case of the SCC. Here, when the UL union method is applied, a PUSCH HARQ process (i.e. UL grant/PUSCH/PHICH transmission) in the SCC can be performed at UL grant or PHICH timing defined in UD-cfg #6 (MCC). When Method 3-2 is applied to a specific PUSCH HARQ process starting with initial PUSCH transmission in SF #3 of the SCC, the UE can perform the following operation based on UD-cfg #6 (MCC).

1) UL grant reception at UL grant timing (D0) for scheduling a PUSCH in SF #2

2) PUSCH transmission (initial transmission) in SF #2

3) PHICH reception at PHICH timing (D1) for PUSCH transmission in SF #2

UL grant reception at UL grant timing (D2) for scheduling a PUSCH in SF #13 (=#2+11(RTT))

Here, D1 and D2 may be the same SF timing.

4) PUSCH transmission (first transmission) in SF #13

5) PHICH reception at PHICH timing (D3) for PUSCH transmission in SF #13

6) UL grant reception at UL grant timing (D4) for scheduling a PUSCH in SF #27 (=#13+14(RTT))

Here, D3 and D4 may be the same SF timing or different SF timings. D4 may include D3 and may be configured as D4 SF timing (valid in terms of UL union timing) closest to D3 after D3.

When timing defined in UD-cfg #6 corresponding to a UL union is applied, retransmission of a PUSCH in SF #13 can be performed in SF #24. However, since a DL or S SF instead of a UL SF is defined in the SCC in case of SF #24, PUSCH transmission in SF #24, reception of a UL grant that schedules the PUSCH transmission, and PHICH reception with respect to the PUSCH transmission can be omitted and retransmission of the PUSCH in SF #13 can be performed through SF #27 corresponding to the first SCC UL SF available after SF #24 according to the proposed method.

7) PUSCH transmission (second transmission) in SF #27 (=#13+14(RTT))

8) PHICH reception at PHICH timing (D5) for PUSCH transmission in SF #27

UL grant reception at UL grant timing (D6) for scheduling a PUSCH in SF #38 (=#27+11(RTT))

Here, D5 and D6 may be the same SF timing

9) PUSCH transmission (third transmission) in SF #38

10) PHICH reception at PHICH timing (D7) for PUSCH transmission in SF #38

UL grant reception at UL grant timing (D8) for scheduling a PUSCH in SF #52 (=#38+14(RTT))

Here, D7 and D8 may be the same SF timing

The above-described example will now be explained in more detail.

When UL HARQ timing defined in UD-cfg #6 corresponding to a UL union is applied to an SCC, the following UL HARQ process for an SCC PUSCH can be expected.

SF #2: PUSCH=>SF #6: PHICH+UG=>SF #13: PUSCH=>SF #19: PHICH+UG=>SF #24: PUSCH (invalid on SCC)=>SF #30: PHICH+UG=>SF #37: PUSCH=>SF #41: PHICH+UG=>SF #48: PUSCH=>SF #55: PHICH+UG=>SF #62: PUSCH However, SF #24 cannot be used for SCC PUSCH transmission because SCC (UD-cfg #1) corresponds to DL in SF #24. Accordingly, UL HARQ timing can be determined as follows when Method 3-2 is applied to the SCC.

SF #2: PUSCH=>SF #6: PHICH+UG=>SF #13: PUSCH=>SF #19: PHICH=>SF #20: UG=>SF #27: PUSCH=>SF #31: PHICH+UG=>SF #38: PUSCH=>SF #45: PHICH+UG=>SF #52: PUSCH

FIGS. 21 to 25 illustrate UG/PHICH timing with respect to SCC U (which can support 10-SF synchronous HARQ) calculated through Method 3-1 according to UD-cfg of an MCC and UD-cfg of an SCC. FIGS. 21 to 25 respectively show cases in which UD-cfg of the MCC corresponds to #0, #1, #2, #3 and #6. In the figures, numeral k configured for SF #m means that UG/PHICH timing for a PUSCH transmitted through an SCC U in SF #(m+k) is configured to D of the MCC in SF #m.

Only FIGS. 21 and 24 are described because FIGS. 21 to 25 illustrate the same or similar schemes. Referring to FIG. 21, when the MCC corresponds to UD-cfg #0 and the SCC corresponds to UD-cfg #6 (5 Us are present in SFs #2, #3, #4, #7 and #8), 10-SF RTT synchronous HARQ can be supported only for SCC Us (n−UG≤6) corresponding to SFs #2, #4 and #7 and Alts 0 to 3 can be applied to SCC Us (n−UG>6) corresponding to SFs #3 and #8 (by configuring MCC Ds of SFs #0, #1 and #6 as UG or PHICH timing). Referring to FIG. 24, when the MCC corresponds to UD-cfg #3 and the SCC corresponds to UD-cfg #1 (4 Us are present in SFs #2, #3, #7 and #8), 10-SF RTT synchronous HARQ can be supported only for SCC Us (n−UG≤6) corresponding to SFs #2, #3 and #7 and Alts 0 to 3 can be applied to an SCC U (n−UG>6) corresponding to SF #8 (by configuring MCC Ds of SFs #1, #8 and #9 as UG or PHICH timing).

When UG or PHICH timing is configured using Method 3-0, 3-0-1, 3-1 or 3-2 (or other methods), a specific D (e.g. MCC-D1) of the MCC, which is not configured to transmit a UG or PHICH when the MCC operates alone, can be configured as UG or PHICH timing for PUSCH transmission in a specific U of the MCC/SCC. For convenience, a U of the MCC/SCC corresponding to MCC-D1 configured as UG or PHICH timing is called an orphan U. Here, MCC-D1 can be identified with reference to Tables 1, 6 and 7. In this case, the orphan U (or all Us of a CC including the orphan U) can be used for one-time PUSCH scheduling/transmission depending only on instantaneous UG (without involving a PHICH based HARQ process). Here, one-time PUSCH transmission means, although a HARQ process is accompanied without a PHICH, to perform only UL grant based (adaptive) retransmission without non-adaptive retransmission. For example, one-time PUSCH transmission can be used to carry UL data and/or UCI (e.g. ACK/NACK and/or CQI/PMI/RI, etc.) (which do not involve a PHICH based HARQ process). Otherwise, a scheme of limiting PUSCH scheduling/transmission for the orphan U (or all Us of the CC including the orphan U) and using the orphan U for other purposes (e.g. PUCCH and/or SRS and/or PRACH transmission) can be considered. In this case, the UE can omit a procedure (e.g. search space monitoring and blind decoding of PDCCH candidates) for receiving a UL grant DCI format in the D of the MCC, which corresponds to the orphan U.

Embodiment 4

Signal Transmission and Reception Timing and UL HARQ Process

The UL HARQ process configuration scheme of embodiment 3 processes non-applicable MS-comb on the assumption that embodiments 1 and 2 are applied. In the present embodiment, a generalized UL HARQ process configuration scheme that can be applied irrespective of CC combination (i.e. UD-cfg) is described. The following method can be considered.

HARQ Process Configuration—Method 4-1
  UG or PHICH for PUSCH transmission in MCC U
    UG or PHICH timing of an MCC can be applied.
  UG or PHICH for PUSCH transmission in SCC U (i.e. SF #n)
    UG timing (hereinafter, SF #UG): this can be set to a D of an MCC closest to SF #(n−p) or SF #n present prior to SF #(n−p). Here, p is an integer greater than 1, preferably, 4.
    PHICH timing (hereinafter, SF #PH): this can be configured as a D of an MCC corresponding to a time after N*10 SFs or N*10 ms from UG timing, that is, SF #(UG+N*10). Here, N is an integer equal to or greater than 1. For example, N can be 1.
    In case of n−UG>10−p (e.g. 6): synchronous HARQ having a HARQ RTT of 10 SFs or 10 ms cannot be supported for an SCC U corresponding to SF #n because PH−n<p (e.g. 4). Accordingly, the following scheme can be considered for the SCC U.
  Alt 1) Synchronous HARQ having a HARQ RTT of 20 SFs or 20 ms can be supported by respectively configuring UG timing and PHICH timing to SF #UG and SF #(UG+20).
  Alt 2) Only the UG timing is configured as SF #UG (that is, PHICH timing is not configured) and SF #n can be used for one-time PUSCH scheduling/transmission depending only on an instantaneous UG (without an accompanying a PHICH based HARQ process). Here, one-time PHICH transmission serves to perform only UL grant based (adaptive) retransmission without non-adaptive retransmission, which involves a HARQ process without a PHICH. For example, one-time PUSCH transmission can be used to carry UL data and/or UCI (e.g. ACK/NACK and/or CQI/PMI/R, etc.) (which do not involve a PHICH based HARQ process).
  Alt 3) PUSCH scheduling/transmission for the SCC U corresponding to SF #n can be limited and the SCC U corresponding to SF #n can be used for other purposes (e.g. PUCCH and/or SRS and/or PRACH transmission).

The following exceptions can be defined for the above-described rule considering that HARQ RTT of UD-cfgs #0 and #6 is not 10 SFs or 10 ms.
  When the MCC corresponds to UD-cfgs #1 to #6 and the SCC corresponds to UD-cfg #0, UG or PHICH timing and UL HARQ RTT configured for the SCC can be used.
  When the MCC corresponds to UD-cfgs #1 to #5 and the SCC corresponds to UD-cfg #6, UG or PHICH timing and UL HARQ RTT configured for the SCC can be used.

FIG. 26 illustrates UG/PHICH timing with respect to SCC U calculated through Method 4-1 according to UD-cfg of an MCC and UD-cfg of an SCC. In FIG. 26, numeral k configured for SF #m means that UG/PHICH timing for a PUSCH transmitted through an SCC U in SF #(m+k) is configured to D of the MCC in SF #m. FIG. 27 illustrates SCC Us (denoted by "0") which can support 10-SF synchronous HARQ when UG/PHICH timing of FIG. 26 is employed.

Referring to FIGS. 26 and 27, when the MCC corresponds to UD-cfg #3 and the SCC corresponds to UD-cfg #1 (4 Us are present in SFs #2, #3, #7 and #8), 10-SF RTT synchronous HARQ can be supported only for SCC Us corresponding to SFs #2, #3 and #7 and Alts 1 to 3 can be applied to SCC U corresponding to SF #8 (by configuring MCC Ds corresponding to SFs #1, #8 and #9 as UG or PHICH timing). Alternatively, when the MCC corresponds to UD-cfg #3 and the SCC corresponds to UD-cfg #0 or #6, UG or PHICH timing and UL HARQ RTT configured for the SCC can be applied to SCC Us. Alternatively, when the MCC corresponds to UD-cfg #0 and the SCC corresponds to UD-cfg #6 (5 Us are present in SFs #2, #3, #4, #7 and #8), 10-SF RTT synchronous HARQ can be supported only for SCC Us corresponding to SFs #2, #4 and #7 and Alts 1 to 3 can be applied to SCC Us corresponding to SFs #3 and #8 (by configuring MCC Ds corresponding to SFs #0, #1 and #6 as UG or PHICH timing).

HARQ Process Configuration—Method 4-2

Method 4-2 is based on the assumption that the UL HARQ RTT is N*10 SFs or N*10 ms for all SCCs irrespective of MCC. Here, N is an integer equal to or greater than 1. Accordingly, it is assumed that the UL HARQ RTT of an SCC is changed to N*10 SFs or N*10 ms irrespective of MCC even when the SCC corresponds to UD-cfgs #0 and #6. In this case, the following scheme can be considered.

UG or PHICH for PUSCH transmission in MCC U
    UG or PHICH timing of an MCC can be applied.
UG or PHICH for PUSCH transmission in SCC U (i.e. SF #n)
    UG timing (hereinafter, SF #UG): this can be configured as a D of an MCC closest to SF #(n−p) or SF #n present prior to SF #(n−p). Here, p is an integer greater than 1, preferably, 4.
    PHICH timing (hereinafter, SF #PH): this can be configured as a D of an MCC corresponding to a time after N*10 SFs or N*10 ms from UG timing, that is, SF #(UG+N*10). Here, N is an integer equal to or greater than 1. For example, N can be 1.
    In case of n−UG>10−p (e.g. 6): synchronous HARQ having a HARQ RTT of 10 SFs or 10 ms cannot be supported for an SCC U corresponding to SF #n because PH−n<p (e.g. 4). Accordingly, the following scheme can be considered for the SCC U.

Alt 1) Synchronous HARQ having a HARQ RTT of 20 SFs or 20 ms can be supported by respectively configuring UG timing and PHICH timing to SF #UG and SF #(UG+20).

Alt 2) Only the UG timing is configured as SF #UG (that is, PHICH timing is not configured) and SF #n can be used for one-time PUSCH scheduling/transmission depending only on an instantaneous UG (without an accompanying a PHICH based HARQ process). Here, one-time PHICH transmission serves to perform only UL grant based (adaptive) retransmission without non-adaptive retransmission, which involves a HARQ process without a PHICH. For example, one-time PUSCH transmission can be used to carry UL data and/or UCI (e.g. ACK/NACK and/or CQI/PMI/R, etc.) (which do not involve a PHICH based HARQ process).

Alt 3) PUSCH scheduling/transmission for the SCC U corresponding to SF #n can be limited and the SCC U corresponding to SF #n can be used for other purposes (e.g. PUCCH and/or SRS and/or PRACH transmission).

FIG. 28 illustrates UG/PHICH timing with respect to SCC U calculated through Method 4-2 according to UD-cfg of an MCC and UD-cfg of an SCC. In FIG. 28, numeral k configured for SF #m means that UG/PHICH timing for a PUSCH transmitted through an SCC U in SF #(m+k) is configured to D of the MCC in SF #m. FIG. 29 illustrates SCC Us (denoted by "O") which can support 10-SF synchronous HARQ when UG/PHICH timing of FIG. 28 is employed.

Referring to FIGS. 28 and 29, when the MCC corresponds to UD-cfg #1 and the SCC corresponds to UD-cfg #6 (5 Us are present in SFs #2, #3, #4, #7 and #8), 10-SF RTT synchronous HARQ can be supported for all SCC Us (by configuring MCC Ds corresponding to SFs #0, #1, #4, #5 and #6 as UG or PHICH timing). Alternatively, when the MCC corresponds to UD-cfg #6 and the SCC corresponds to UD-cfg #0 (6 Us are present in SFs #2, #3, #4, #7, #8 and #9), 10-SF RTT synchronous HARQ can be supported only for SCC Us corresponding to SFs #2, #3, #4, #7 and #9 and Alts 1 to 3 can be applied to SCC U corresponding to SF #8 (by configuring MCC Ds corresponding to SFs #0, #1, #5, #6 and #9 as UG or PHICH timing).

When UG or PHICH timing is configured using the above proposed method (or other methods), a specific D (e.g. MCC-D1) of the MCC, which is not configured to transmit a UG or PHICH when the MCC operates alone, can be configured as UG or PHICH timing for PUSCH transmission in a specific U of the MCC/SCC. For convenience, a U of the MCC/SCC, which corresponds to MCC-D1 configured as UG or PHICH timing, is called an orphan U. Here, MCC-D1 can be identified with reference to Tables 1, 6 and 7. In this case, the orphan U (or all Us of a CC including the orphan U) can be used for one-time PUSCH scheduling/transmission depending only on instantaneous UG (without involving a PHICH based HARQ process). Here, one-time PUSCH transmission means, although a HARQ process is accompanied without a PHICH, to perform only UL grant based (adaptive) retransmission without non-adaptive retransmission. For example, one-time PUSCH transmission can be used to carry UL data and/or UCI (e.g. ACK/NACK and/or CQI/PMI/RI, etc.) (which do not involve a PHICH based HARQ process). Otherwise, a scheme of limiting PUSCH scheduling/transmission for the orphan U (or all Us of the CC including the orphan U) and using the orphan U for other purposes (e.g. PUCCH and/or SRS and/or PRACH transmission) can be considered. In this case, the UE can omit a procedure (e.g. search space monitoring and blind decoding of PDCCH candidates) for receiving a UL grant DCI format in the D of the MCC, which corresponds to the orphan U.

Figure 30:
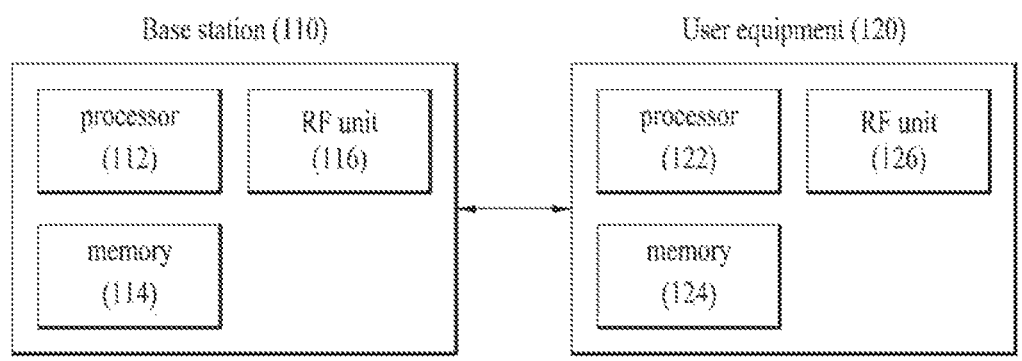
FIG. 30 illustrates a base station (BS) and a user equipment (UE) applicable to an embodiment of the present invention.

FIG. 30 illustrates a BS and a UE applicable to an embodiment of the present invention. When a wireless communication system includes a relay, communication is performed between a BS and the relay on a backhaul link and between the relay and a UE on an access link. The BS or UE shown in FIG. 16 can be replaced by a relay as necessary.

Referring to FIG. 30, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication apparatuses such as a UE, a relay, a BS, etc.

The invention claimed is:

1. A method for transmitting an uplink signal by a wireless device in a wireless communication system, the method comprising:
configuring, by the wireless device, a primary cell of a first Time Division Duplex Uplink-Downlink (TDD UL-DL) configuration and a secondary cell of a second TDD UL-DL configuration different from the first TDD UL-DL configuration; and
for one or more downlink data on the secondary cell in subframe #n−k' ((k'∈K'), transmitting, by the wireless device, acknowledgement information about the one or more downlink data in subframe #n according to a reference TDD UL-DL configuration different from the second TDD UL-DL configuration,
wherein K' contains elements of K:$\{k_0, k_1, \ldots, k_{M-1}\}$ of the reference TDD UL-DL configuration such that subframe #n−k' is a downlink subframe or a special subframe for the secondary cell,
wherein K:$\{k_0, k_1, \ldots, k_{M-1}\}$ is defined in Table 1, and TDD UL-DL configurations are defined according to table 2:

TABLE 1

| TDD UL-DL Configuration | \multicolumn{10}{c}{Subframe n} | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 2

| Uplink-downlink configuration | \multicolumn{10}{c}{Subframe number} | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a DL subframe, S denotes a special subframe and U denotes an UL subframe.

2. The method of claim 1, wherein the reference TDD UL-DL configuration is a TDD UL-DL configuration whose DL subframe set includes both a DL subframe set of the first TDD UL-DL configuration and a DL subframe set of the second TDD UL-DL configuration, and each DL subframe set includes DL subframes and one or more special subframe.

3. The method of claim 1,
wherein a relationship between the first TDD UL-DL configuration, the second TDD UL-DL configuration and the reference TDD UL-DL configuration is shown in Table 3 below:

information about the one or more downlink data in subframe #n according to a reference TDD UL-DL configuration different from the second TDD UL-DL configuration,
wherein K' contains elements of K:$\{k_0, k_1, \ldots, k_{M-1}\}$ of the reference TDD UL-DL configuration such that subframe #n−k' is a downlink subframe or a special subframe for the secondary cell,
wherein K:$\{k_0, k_1, \ldots, k_{M-1}\}$ is defined in Table 1, and TDD UL-DL configurations are defined according to table 2:

TABLE 1

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 3

| the first UL-DL configuration | the second UL-DL configuration | the reference UL-DL configuration |
|---|---|---|
| 1 | 0, 6 | 1 |
| 2 | 0, 1, 6 | 2 |
| 3 | 0, 6 | 3 |
| 4 | 0, 1, 3, 6 | 4 |
| 5 | 0, 1, 2, 3, 4, 6 | 5 |
| 6 | 0 | 6 |
| 1 | 3 | 4 |
| 3 | 1 | 4 |
| 3 | 2 | 5 |
| 2 | 3, 4 | 5 |
| 4 | 2 | 5 |

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a DL subframe, S denotes a special subframe and U denotes an UL subframe.

4. The method of claim 1,
wherein the reference TDD UL-DL configuration is TDD UL-DL configuration #4 when (the first TDD UL-DL configuration, the second TDD UL-DL configuration) corresponds to (#1, #3) or (#3, #1),
wherein the reference TDD UL-DL configuration is TDD UL-DL configuration #5 when (the first TDD UL-DL configuration, the second TDD UL-DL configuration) corresponds to (#2, #3), (#3, #2), (#2, #4) or (#4, #2).

5. The method of claim 1, wherein the acknowledgement information is transmitted:
(i) on the primary cell via a physical uplink control channel (PUCCH), or
(ii) on the primary cell or the secondary cell via a physical uplink shared channel (PUSCH).

6. A wireless device for use in a wireless communication system, the wireless device comprising:
a receiver;
a transmitter; and
a processor operatively connected to the receiver and the transmitter, the processor configured to:
configure a primary cell of a first Time Division Duplex Uplink-Downlink (TDD UL-DL) configuration and a secondary cell of a second TDD UL-DL configuration different from the first TDD UL-DL configuration; and
for one or more downlink data on the secondary cell in subframe #n−k' (k'∈K'), transmit acknowledgement 7. The wireless device of claim 6, wherein the reference TDD UL-DL configuration is a TDD UL-DL configuration whose DL subframe set includes both a DL subframe set of the first TDD UL-DL configuration and a DL subframe set of the second TDD UL-DL configuration, and each DL subframe set includes DL subframes and one or more special subframe.

8. The wireless device of claim 6,
wherein a relationship between the first TDD UL-DL configuration, the second TDD UL-DL configuration and the reference TDD UL-DL configuration is shown in Table 3 below:

TABLE 3

| the first UL-DL configuration | the second UL-DL configuration | the reference UL-DL configuration |
|---|---|---|
| 1 | 0, 6 | 1 |
| 2 | 0, 1, 6 | 2 |

TABLE 3-continued

| the first UL-DL configuration | the second UL-DL configuration | the reference UL-DL configuration |
|---|---|---|
| 3 | 0, 6 | 3 |
| 4 | 0, 1, 3, 6 | 4 |
| 5 | 0, 1, 2, 3, 4, 6 | 5 |
| 6 | 0 | 6 |
| 1 | 3 | 4 |
| 3 | 1 | 4 |
| 3 | 2 | 5 |
| 2 | 3, 4 | 5 |
| 4 | 2 | 5 |

9. The wireless device of claim 6,
wherein the reference TDD UL-DL configuration is TDD UL-DL configuration #4 when (the first TDD UL-DL configuration, the second TDD UL-DL configuration) corresponds to (#1, #3) or (#3, #1),
wherein the reference TDD UL-DL configuration is TDD UL-DL configuration #5 when (the first TDD UL-DL configuration, the second TDD UL-DL configuration) corresponds to (#2, #3), (#3, #2), (#2, #4) or (#4, #2).

10. The wireless device of claim 6, wherein the acknowledgement information is transmitted:
(i) on the primary cell via a physical uplink control channel (PUCCH), or
(ii) on the primary cell or the secondary cell via a physical uplink shared channel (PUSCH).

11. A method for receiving an uplink signal by a wireless device in a wireless communication system, the method comprising:
configuring, by the wireless device, a primary cell of a first Time Division Duplex Uplink-Downlink (TDD UL-DL) configuration and a secondary cell of a second TDD UL-DL configuration different from the first TDD UL-DL configuration; and
for one or more downlink data on the secondary cell in subframe #n−k' (k'∈K'), receiving, by the wireless device, acknowledgement information about the one or more downlink data in subframe #n according to a reference TDD UL-DL configuration different from the second TDD UL-DL configuration,
wherein K' contains elements of K:$\{k_0, k_1, \ldots, k_{M-1}\}$ of the reference TDD UL-DL configuration such that subframe #n−k' is a downlink subframe or a special subframe for the secondary cell,
wherein K:$\{k_0, k_1, \ldots, k_{M-1}\}$ is defined in Table 1, and TDD UL-DL configurations are defined according to table 2:

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a DL subframe, S denotes a special subframe and U denotes an UL subframe.

12. The method of claim 11, wherein the reference TDD UL-DL configuration is a TDD UL-DL configuration whose DL subframe set includes both a DL subframe set of the first TDD UL-DL configuration and a DL subframe set of the second TDD UL-DL configuration, and each DL subframe set includes DL subframes and one or more special subframe.

13. The method of claim 11,
wherein a relationship between the first TDD UL-DL configuration, the second TDD UL-DL configuration and the reference TDD UL-DL configuration is shown in Table 3 below:

TABLE 3

| the first UL-DL configuration | the second UL-DL configuration | the reference UL-DL configuration |
|---|---|---|
| 1 | 0, 6 | 1 |
| 2 | 0, 1, 6 | 2 |
| 3 | 0, 6 | 3 |
| 4 | 0, 1, 3, 6 | 4 |
| 5 | 0, 1, 2, 3, 4, 6 | 5 |
| 6 | 0 | 6 |
| 1 | 3 | 4 |
| 3 | 1 | 4 |
| 3 | 2 | 5 |
| 2 | 3, 4 | 5 |
| 4 | 2 | 5 |

14. The method of claim 11,
wherein the reference TDD UL-DL configuration is TDD UL-DL configuration #4 when (the first TDD UL-DL configuration, the second TDD UL-DL configuration) corresponds to (#1, #3) or (#3, #1),
wherein the reference TDD UL-DL configuration is TDD UL-DL configuration #5 when (the first TDD UL-DL configuration, the second TDD UL-DL configuration) corresponds to (#2, #3), (#3, #2), (#2, #4) or (#4, #2).

TABLE 1

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

15. The method of claim 11, wherein the acknowledgement information is received:
  (i) on the primary cell via a physical uplink control channel (PUCCH), or
  (ii) on the primary cell or the secondary cell via a physical uplink shared channel (PUSCH).

16. A wireless device for use in a wireless communication system, the wireless device comprising:
  a receiver;
  a transmitter; and
  a processor operatively connected to the receiver and the transmitter, the processor configured to:
    configure a primary cell of a first Time Division Duplex Uplink-Downlink (TDD UL-DL) configuration and a secondary cell of a second TDD UL-DL configuration different from the first TDD UL-DL configuration; and
    for one or more downlink data on the secondary cell in subframe #n−k' (k'∈K'), receive acknowledgement information about the one or more downlink data in subframe #n according to a reference TDD UL-DL configuration different from the second TDD UL-DL configuration,
  wherein K' contains elements of K:{$k_0, k_1, \ldots, k_{M-1}$} of the reference TDD UL-DL configuration such that subframe #n−k' is a downlink subframe or a special subframe for the secondary cell,
  wherein K:{$k_0, k_1, \ldots, k_{M-1}$} is defined in Table 1, and TDD UL-DL configurations are defined according to table 2:

TABLE 1

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a DL subframe, S denotes a special subframe and U denotes an UL subframe.

17. The wireless device of claim 16, wherein the reference TDD UL-DL configuration is a TDD UL-DL configuration whose DL subframe set includes both a DL subframe set of the first TDD UL-DL configuration and a DL subframe set of the second TDD UL-DL configuration, and each DL subframe set includes DL subframes and one or more special subframe.

18. The wireless device of claim 16, wherein a relationship between the first TDD UL-DL configuration, the second TDD UL-DL configuration and the reference TDD UL-DL configuration is shown in Table 3 below:

TABLE 3

| the first UL-DL configuration | the second UL-DL configuration | the reference UL-DL configuration |
|---|---|---|
| 1 | 0, 6 | 1 |
| 2 | 0, 1, 6 | 2 |
| 3 | 0, 6 | 3 |
| 4 | 0, 1, 3, 6 | 4 |
| 5 | 0, 1, 2, 3, 4, 6 | 5 |
| 6 | 0 | 6 |
| 1 | 3 | 4 |
| 3 | 1 | 4 |
| 3 | 2 | 5 |
| 2 | 3, 4 | 5 |
| 4 | 2 | 5 |

19. The wireless device of claim 16, wherein the reference TDD UL-DL configuration is TDD UL-DL configuration #4 when (the first TDD UL-DL configuration, the second TDD UL-DL configuration) corresponds to (#1, #3) or (#3, #1),
wherein the reference TDD UL-DL configuration is TDD UL-DL configuration #5 when (the first TDD UL-DL configuration, the second TDD UL-DL configuration) corresponds to (#2, #3), (#3, #2), (#2, #4) or (#4, #2).

20. The wireless device of claim 16, wherein the acknowledgement information is received:
  (i) on the primary cell via a physical uplink control channel (PUCCH), or
  (ii) on the primary cell or the secondary cell via a physical uplink shared channel (PUSCH).

* * * * *